(12) United States Patent
Chen et al.

(10) Patent No.: US 12,041,542 B2
(45) Date of Patent: Jul. 16, 2024

(54) SYSTEM AND METHOD FOR THROUGHPUT-BASED OPTIMIZATION FOR TARGET WAKE TIME INTERVAL ADJUSTMENT

(71) Applicant: Samsung Electronics Co., Ltd., Suwon-si (KR)

(72) Inventors: Guanbo Chen, McKinney, TX (US); Jianhua Mo, Allen, TX (US); Wenxun Qiu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 17/659,317

(22) Filed: Apr. 14, 2022

(65) Prior Publication Data

US 2022/0353812 A1 Nov. 3, 2022

Related U.S. Application Data

(60) Provisional application No. 63/176,687, filed on Apr. 19, 2021.

(51) Int. Cl.
| | |
|---|---|
| *H04W 52/02* | (2009.01) |
| *H04W 16/22* | (2009.01) |
| *H04W 28/24* | (2009.01) |
| *H04W 72/12* | (2023.01) |
| *H04W 72/52* | (2023.01) |

(52) U.S. Cl.
CPC ....... *H04W 52/0216* (2013.01); *H04W 16/22* (2013.01); *H04W 28/24* (2013.01); *H04W 72/52* (2023.01)

(58) Field of Classification Search
CPC . H04W 16/22; H04W 28/24; H04W 52/0216; H04W 72/52; H04W 84/12
See application file for complete search history.

(56) References Cited

U.S. PATENT DOCUMENTS

| | | | |
|---|---|---|---|
| 10,433,252 B2 | 10/2019 | Asterjadhi et al. | |
| 11,006,363 B2 | 5/2021 | Rajib et al. | |
| 2016/0219512 A1* | 7/2016 | Asterjadhi | H04W 52/0212 |
| 2018/0295573 A1 | 10/2018 | Gidvani et al. | |
| 2018/0302930 A1* | 10/2018 | Wang | H04W 48/18 |
| 2019/0253967 A1* | 8/2019 | Xiao | H04W 52/0219 |
| 2019/0253968 A1 | 8/2019 | Xiao et al. | |
| 2020/0084102 A1* | 3/2020 | Choi | H04L 41/50 |
| 2020/0221381 A1* | 7/2020 | Homchaudhuri | H04W 52/0235 |
| 2021/0021495 A1 | 1/2021 | Sawabe et al. | |
| 2021/0211900 A1* | 7/2021 | Pius | H04W 24/02 |
| 2023/0189056 A1* | 6/2023 | Choi | H04W 28/02 370/235 |

FOREIGN PATENT DOCUMENTS

WO 2021/252968 A1 12/2021

\* cited by examiner

*Primary Examiner* — Liton Miah

(57) ABSTRACT

A method includes obtaining wireless traffic statistics indicating current conditions and future trends for at least one of throughput, latency, and device power consumption. The method also includes generating penalty functions that reflect the wireless traffic statistics. The method further includes determining a target wakeup time (TWT) interval based on the penalty functions. The method also includes adapting the TWT interval based on a change in the wireless traffic statistics.

20 Claims, 28 Drawing Sheets

SYSTEM AND METHOD FOR THROUGHPUT-BASED OPTIMIZATION FOR TARGET WAKE TIME INTERVAL ADJUSTMENT

CROSS-REFERENCE TO RELATED APPLICATIONS AND CLAIM OF PRIORITY

The present application claims priority under 35 U.S.C. § 119(e) to U.S. Provisional Patent Application Ser. No. 63/176,687 filed on Apr. 19, 2021, which is hereby incorporated by reference in its entirety.

TECHNICAL FIELD

The present disclosure relates generally to wireless communication systems and, more specifically, the present disclosure relates to a system and method for throughput-based optimization for target wake time (TWT) interval adjustment.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the Wi-Fi 6 certification program for guaranteeing interoperability between certified products implementing IEEE 802.11ax amendment. In the market, device manufacturers are already starting to release Wi-Fi 6 certified smart mobile devices.

Target Wake Time (TWT) is one of the important features of the IEEE 802.11ax amendment. TWT enables wake time negotiation between an access point (AP) and an associated station (STA) for improving power efficiency. The wake time negotiation gives rise to TWT sessions (e.g., consecutive TWT sessions), where the STA wakes up at pre-negotiated times and for specified durations of time to communicate with the AP (e.g., via UL and/or DL communications). The IEEE 802.11ax amendment allows for periodic awakening, non-periodic awakening, and at-will awakening by the STA.

SUMMARY

The present disclosure relates to wireless communication systems and, more specifically, to a system and method for throughput-based optimization for TWT interval adjustment.

In one embodiment, a method includes obtaining wireless traffic statistics indicating current conditions and future trends for at least one of throughput, latency, and device power consumption. The method also includes generating penalty functions that reflect the wireless traffic statistics. The method further includes determining a TWT interval based on the penalty functions. The method also includes adapting the TWT interval based on a change in the wireless traffic statistics.

In another embodiment, a device includes a memory configured to store instructions. The device also includes a processor operably connected to the memory. The processor is configured when executing the instructions to: obtain wireless traffic statistics indicating current conditions and future trends for at least one of throughput, latency, and device power consumption; generate penalty functions that reflect the wireless traffic statistics; determine a TWT interval based on the penalty functions; and adapt the TWT interval based on a change in the wireless traffic statistics.

In yet another embodiment, a non-transitory computer readable medium includes a plurality of instructions. The plurality of instructions, when executed by at least one processor, is configured to cause the at least one processor to: obtain wireless traffic statistics indicating current conditions and future trends for at least one of throughput, latency, and device power consumption; generate penalty functions that reflect the wireless traffic statistics; determine a TWT interval based on the penalty functions; and adapt the TWT interval based on a change in the wireless traffic statistics.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

Figure 1:
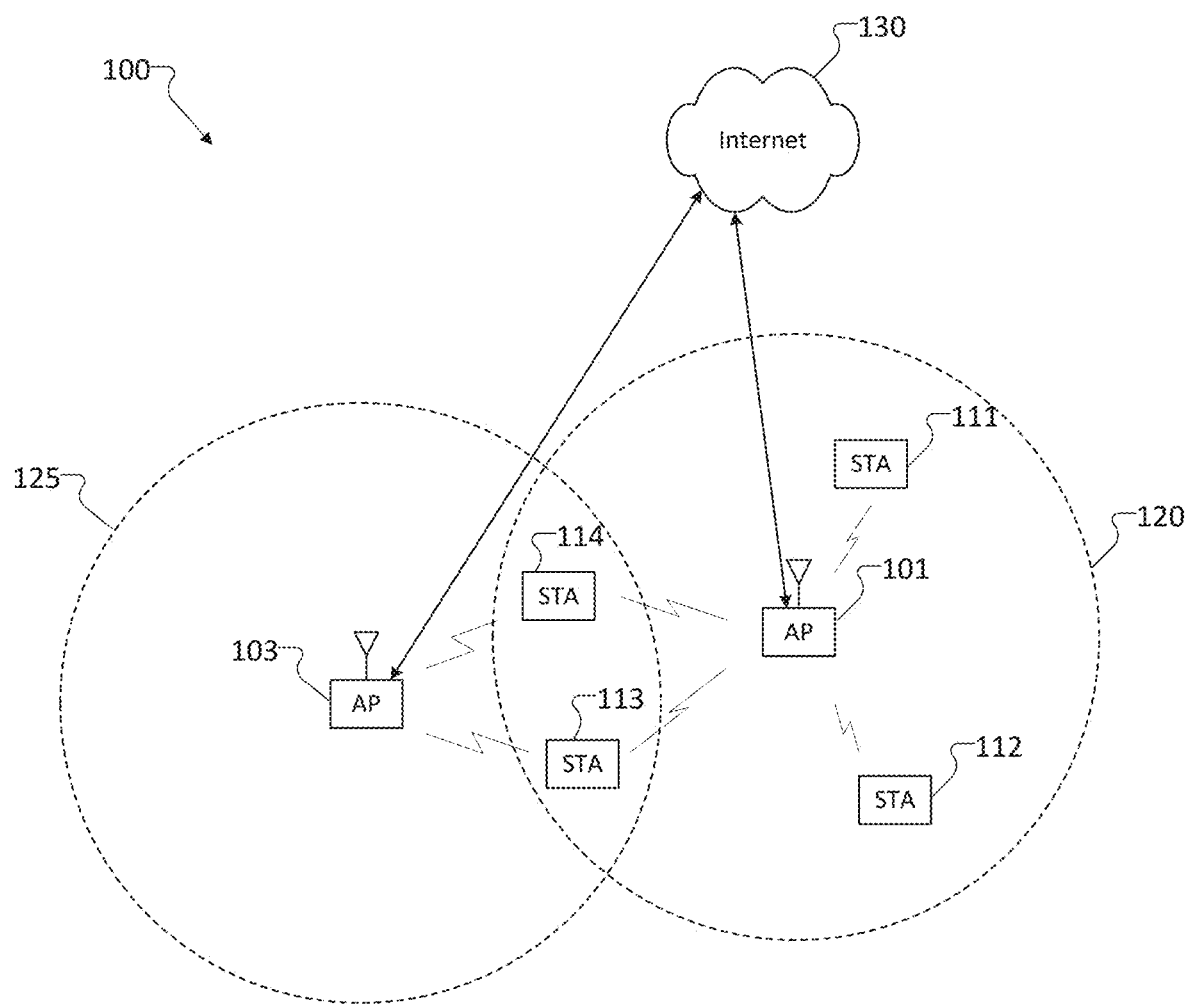
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for throughput-based optimization for TWT interval adjustment. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of TAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
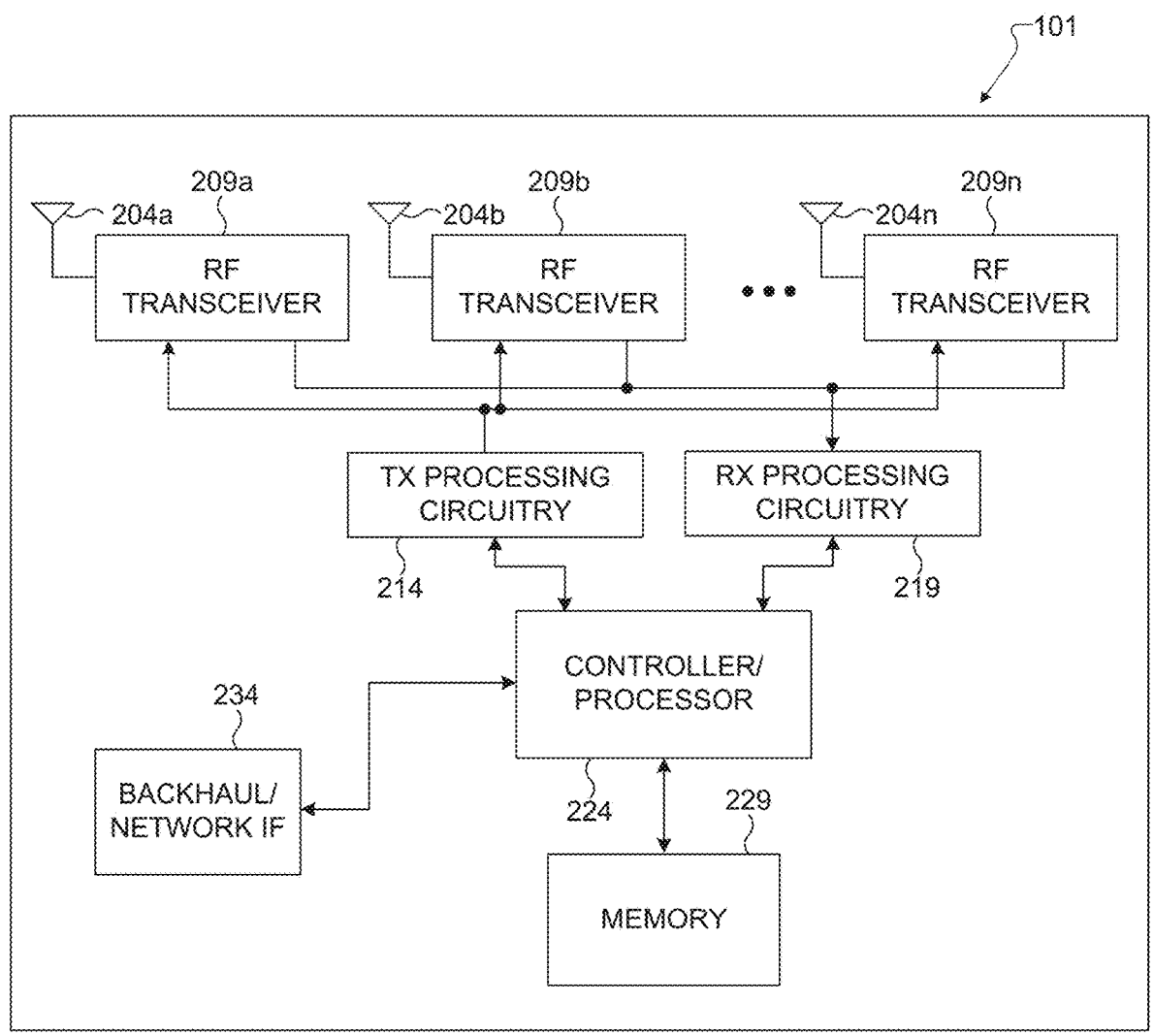
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of uplink channel signals and the transmission of downlink channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including determining parameters for TWT operations. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for throughput-based optimization for TWT interval adjustment. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
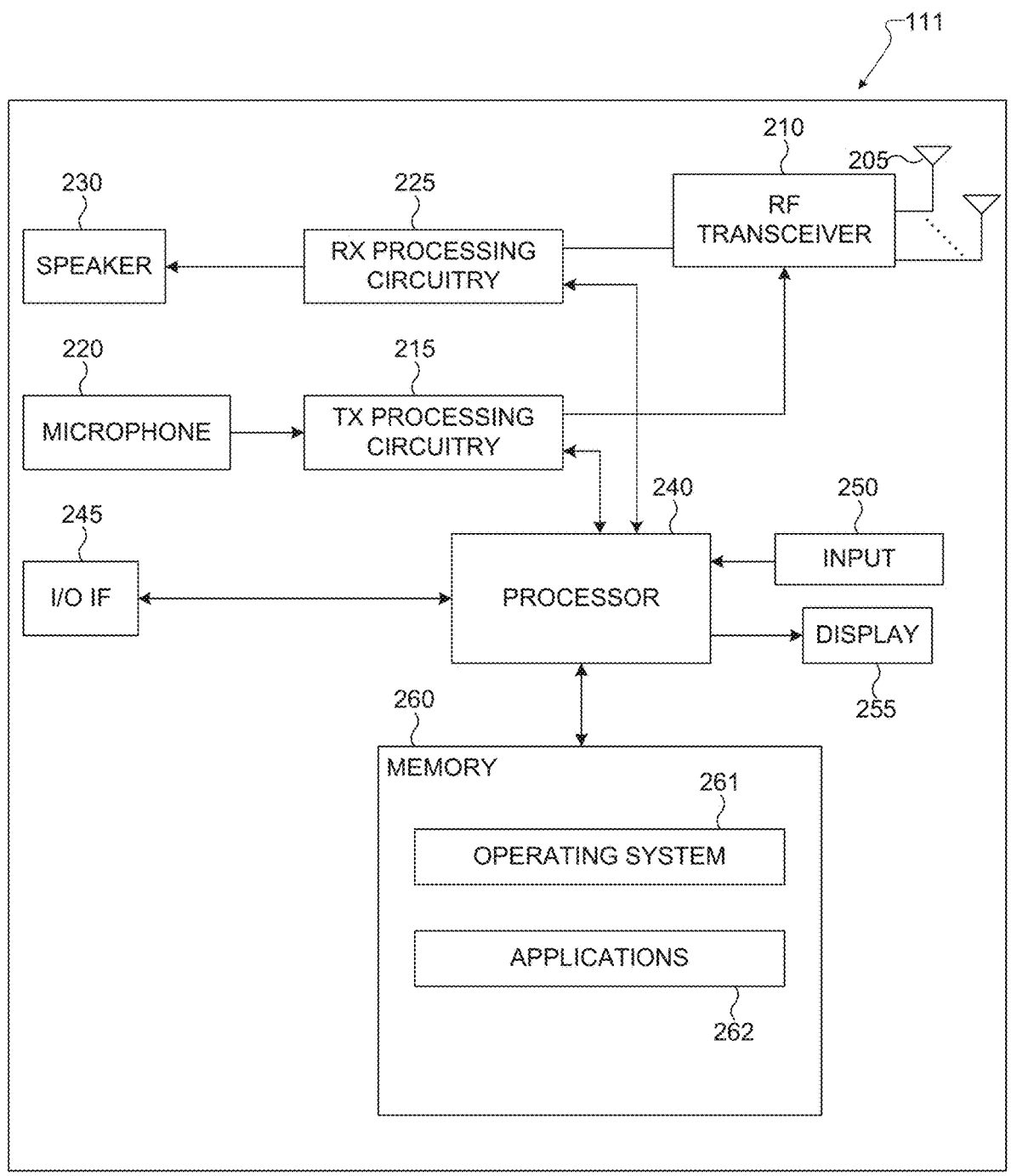
FIG. 2B illustrates an example STA according to embodiments of the present disclosure.

FIG. 2B illustrates an example STA 111 according to various embodiments of this disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of downlink channel signals and the transmission of uplink channel signals by the RF transceiver 210, the RX processing circuitry 225, and the TX processing circuitry 215 in accordance with well-known principles. The main controller/processor 240 can also include processing circuitry configured for throughput-based optimization for TWT interval adjustment. In some embodiments, the controller/processor 240 includes at least one microprocessor or microcontroller.

The controller/processor 240 is also capable of executing other processes and programs resident in the memory 260, such as operations for determining parameters for TWT operations in WLANs. The controller/processor 240 can move data into or out of the memory 260 as required by an executing process. In some embodiments, the controller/processor 240 is configured to execute a plurality of applications 262, such as applications for determining an idle or active state of the Wi-Fi link, and determining TWT parameters such as the TWT interval for TWT operation. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
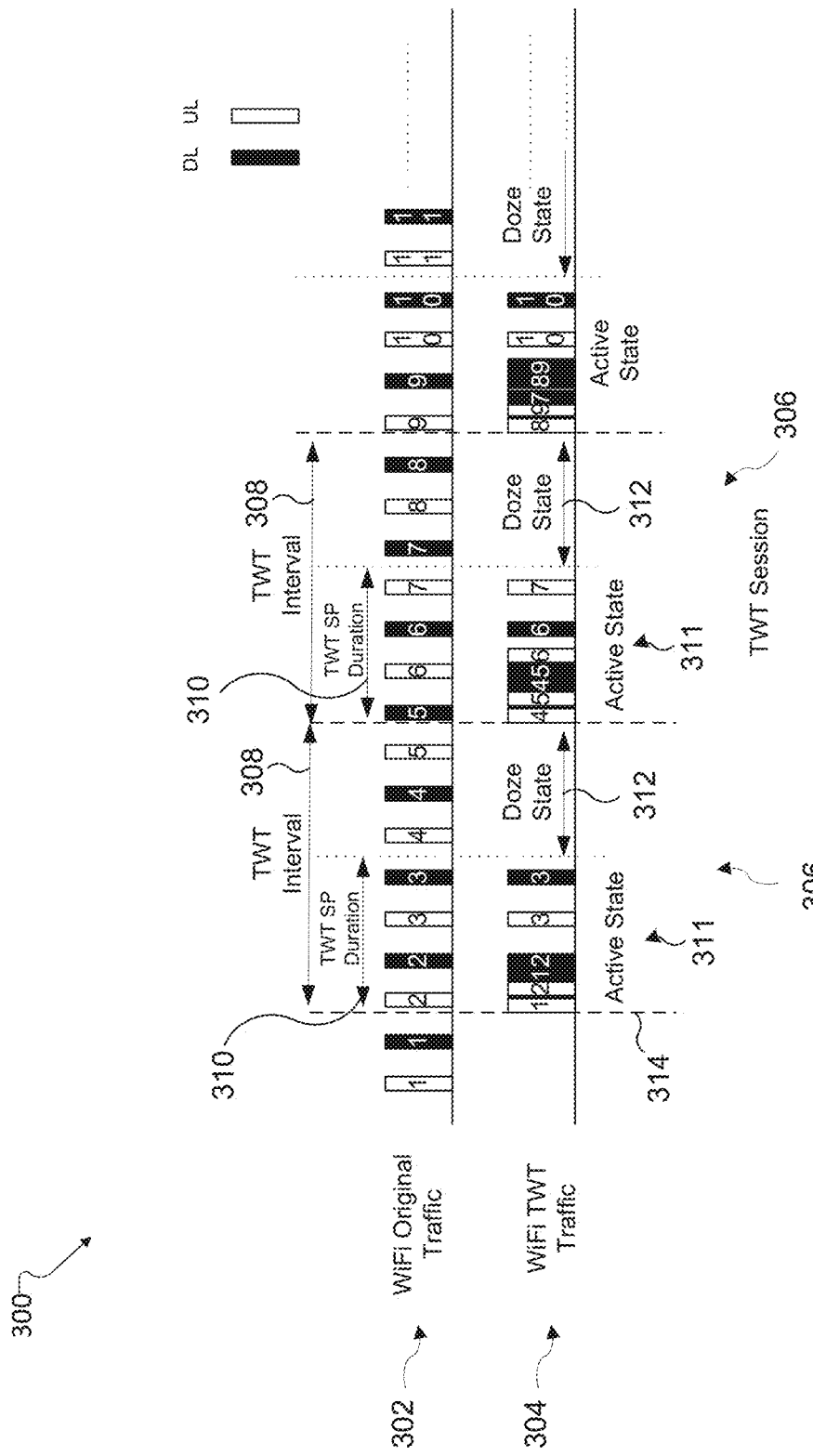
FIG. 3 illustrates a diagram of packet exchange between devices according to embodiments of the present disclosure.

FIG. 3 illustrates a diagram 300 of packet exchange between devices according to embodiments of the present disclosure. For the purposes of this disclosure, the figures will be discussed from the point of view of a STA, which may be a STA 111, but it is understood that it could be any suitable wireless communication device.

FIG. 3 illustrates two scenarios of exchange of uplink (UL) communication packets and downlink (DL) communication packets (which may be collectively referred to as traffic) between an AP and an associated client STA. First, without wake time negotiation between the AP and the STA (e.g., as seen in the top graph 302), and second, with wake time negotiation between the AP and the STA (e.g., in an IEEE 802.11ax system and as seen in the bottom graph 304). In the top graph 302, there is a regular stream of non-buffered traffic between the AP and the STA, with UL packets being interspersed with DL packets. In this scenario (i.e., without wake time negotiation) there is no option for the STA to enter a doze state or a power save state.

By contrast, in the bottom graph 304, wake time negotiation gives rise to consecutive TWT sessions 306. Each TWT session 306 is defined as the time period from the beginning of a TWT interval 308 to the end of the TWT interval 308. Each TWT session 306 includes two states: an active state 311, defined by a TWT service period (SP) duration 310 (during which the STA is awake to communicate with the AP), and a power save state or doze state 312 (during which the STA is not actively awake or communicating with the AP). As a result of wake time negotiation, power efficiency at the STA is improved without adding too much latency or allowing UL or DL packets to be dropped.

In wake time negotiation, the negotiated TWT parameters include the wake interval (e.g., the TWT interval 308 for each TWT session 306), wake duration (e.g. the TWT SP duration 310 for each TWT session 306), and initial wake time or offset (e.g., indicated by the TWT start time 314). These negotiated parameters highly affect latency, throughput, and power efficiency, which are directly related to the QoS (quality of service) a customer experiences. Services with different traffic characteristics can have different TWT parameter configurations for better QoS. Additionally, the TWT configuration should adapt to network and service status variation.

Figure 4:
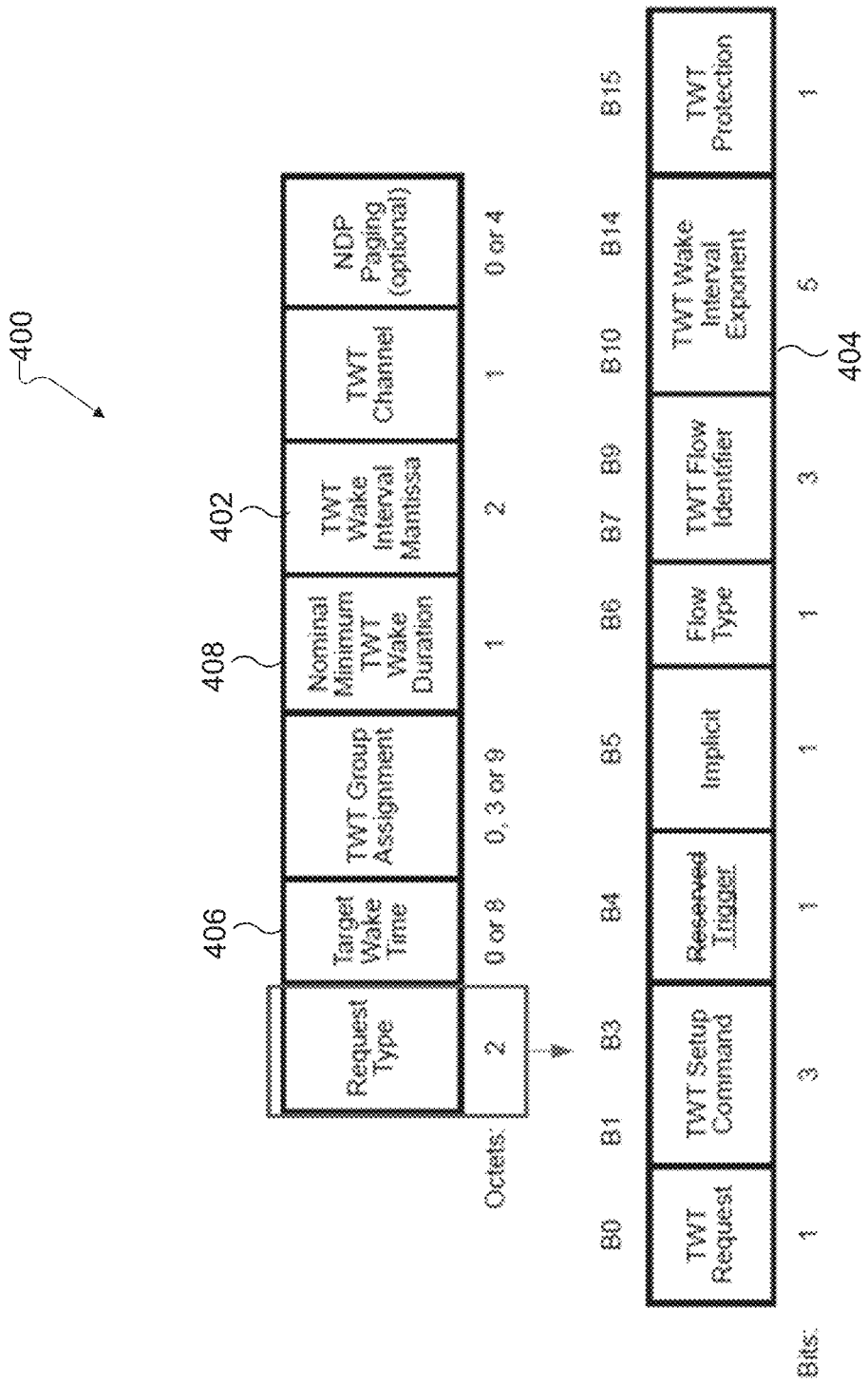
FIG. 4 illustrates an example TWT parameter set field used for TWT parameter negotiation according to embodiments of the present disclosure.

In some embodiments, a TWT parameter set field is used to negotiate the TWT parameters. FIG. 4 illustrates an example TWT parameter set field 400 used for TWT parameter negotiation according to embodiments of the present disclosure. The TWT agreement is initiated by a STA sending a TWT negotiation request to an AP. Once a TWT agreement is made between the AP and the STA, the STA periodically wakes up to communicate with the AP, where the interval between the successive wake times is jointly specified by the TWT wake interval mantissa 402 and TWT wake interval exponent 404 subfields in the TWT parameter set field 400.

The target wake time 406 and nominal minimum TWT wake duration 408 subfields specify, respectively, the first wake time for the TWT agreement, and the time for which the STA must wait before going to doze state when there is no transmitted traffic after a wake time, which is the TWT SP duration 310 in FIG. 3.

Figure 5:
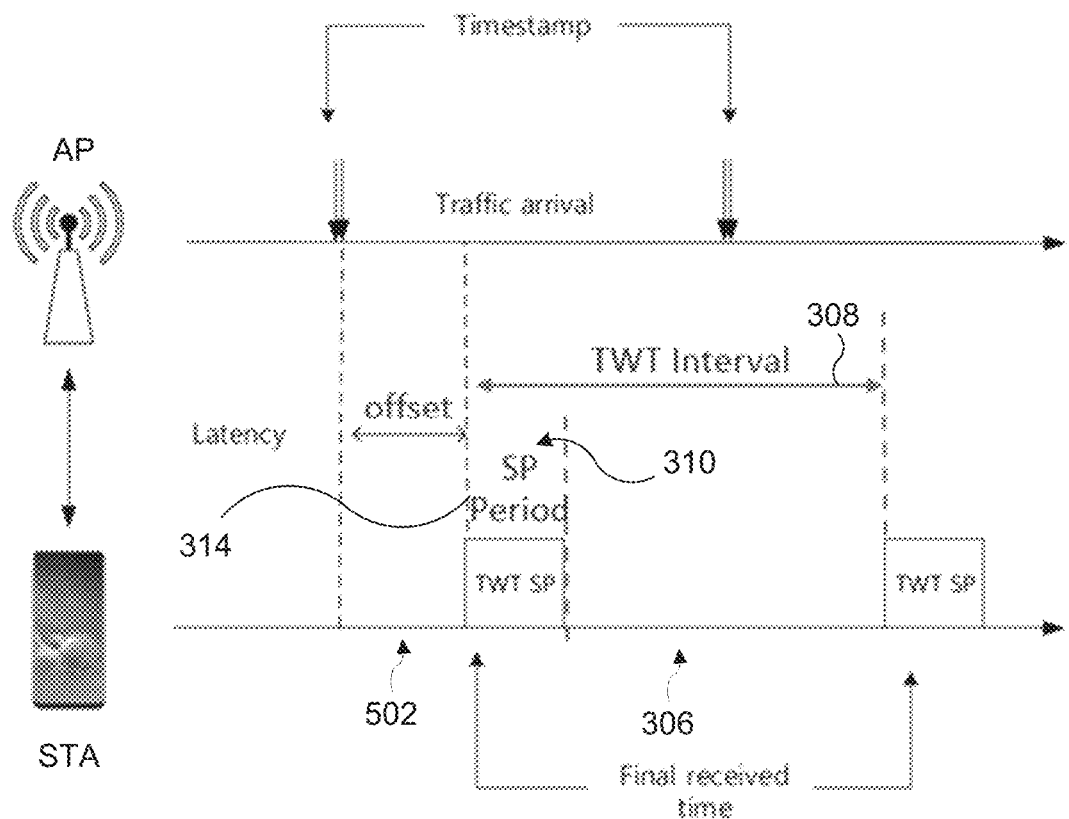
FIG. 5 illustrates an offset in a TWT session according to embodiments of the present disclosure.
Figure 6:
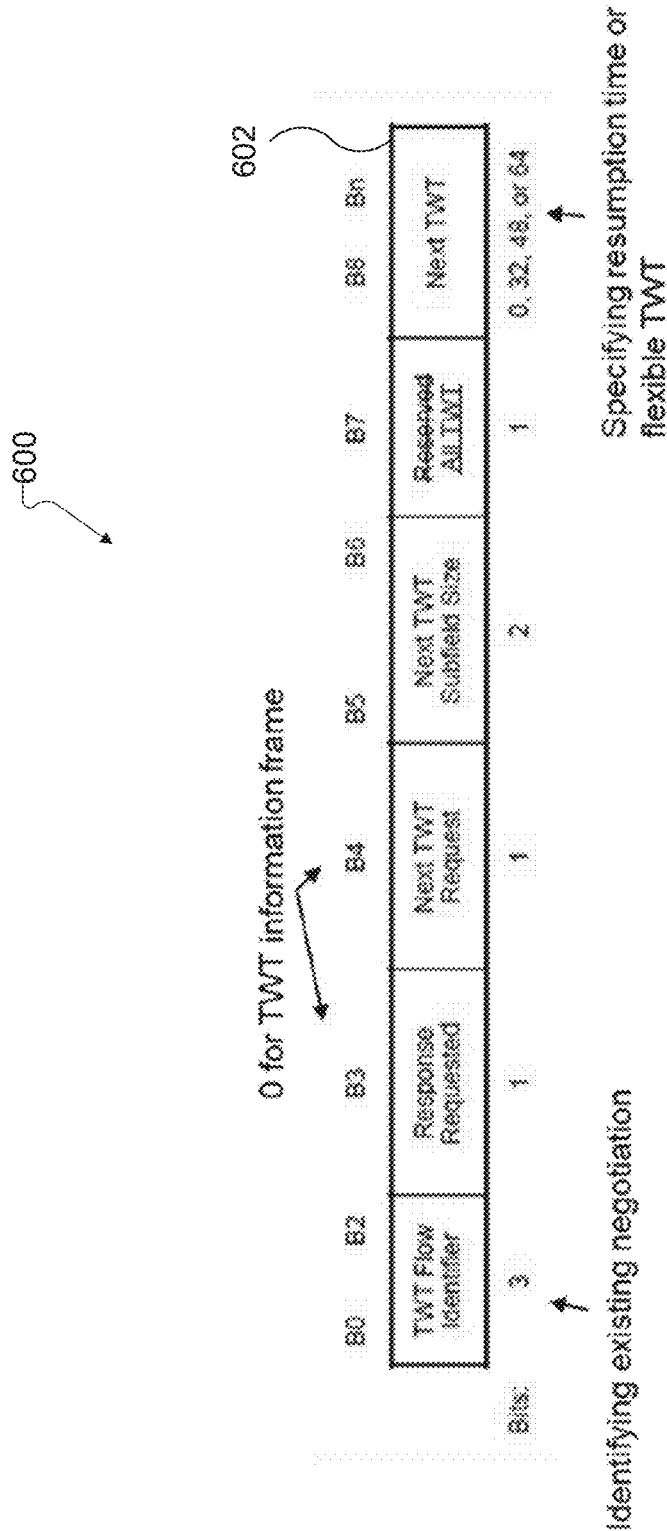
FIG. 6 illustrates an example TWT information frame according to embodiments of the present disclosure.

Other than the wake interval and wake duration, offset is also an important impact factor on the user experience, as the offset could affect the latency. FIG. 5 illustrates an offset in a TWT session according to embodiments of the present disclosure. Different offsets 502 introduce a different additional TWT related latency. TWT interval 308 and offset 502 together define the additional latency introduced by TWT. After TWT negotiation setup, the offset 502 can be adjusted by the field "Next TWT" 602 in the example TWT information frame 600 illustrated in FIG. 6.

Figure 7:
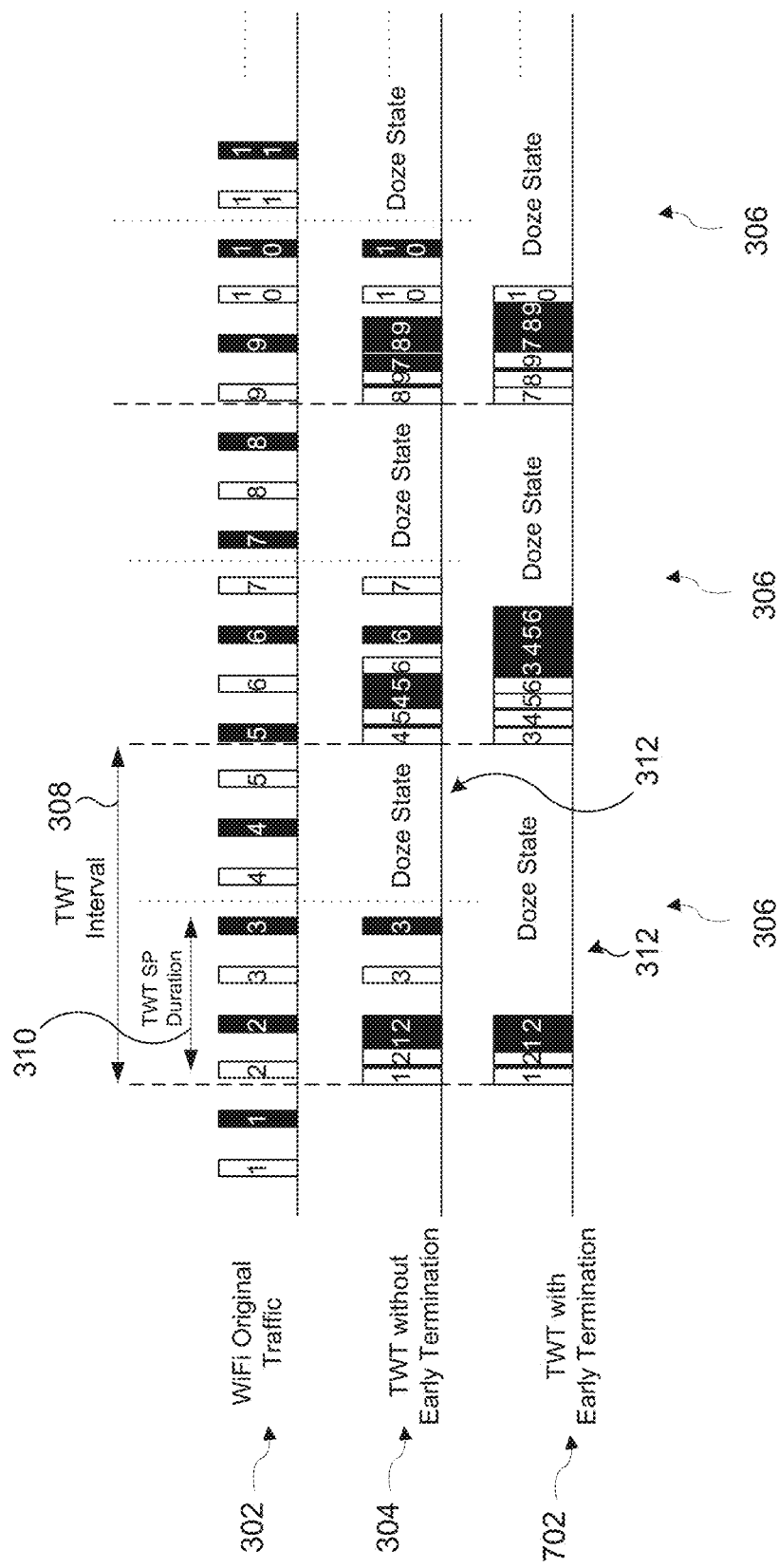
FIG. 7 illustrates an example of early termination of TWT according to embodiments of the present disclosure.

FIG. 7 illustrates an example of early termination of TWT according to embodiments of the present disclosure. In various embodiments, the actual TWT SP duration 310 is dynamically determined in run time by the aforementioned nominal minimum TWT wake duration, and the STA enters the doze state 312 when a packet is received with EOSP (end of service period) bit set to "1", or more data bit set to "0". Depending on whether or not early termination is supported, the time the STA enters the doze state 312 will be slightly different. As shown in the graph 702, if the STA supports early termination then once the STA receives a packet with EOSP bit set to "1" or more data bit "0" the STA can enter doze state 312 (although there could be a slight delay between reception of the packet and entering doze state 312). If the STA does not support early termination, then it will wait until the end of the TWT SP duration 310 to enter doze state 312, as shown in graph 304.

TWT can help save device power by setting a specific STA wakeup interval and the wakeup SP, which can reduce the time or power consumption when the STA is awake but with no data exchange between the AP and STA. However, TWT operation itself also introduces additional traffic latency and device power consumption when performing TWT actions such as device wakeup and sending ESOP information. These two negative effects can be referred to as (i) TWT introduced traffic latency, and (ii) TWT introduced power consumption, respectively. The severity of these two negative effects are mainly determined by the TWT wakeup interval, and there is a trade-off relationship between the two effects. Thus, it is advantageous to maximize the benefit of adopting TWT operations through minimizing the negative effects caused by TWT.

Figure 8:
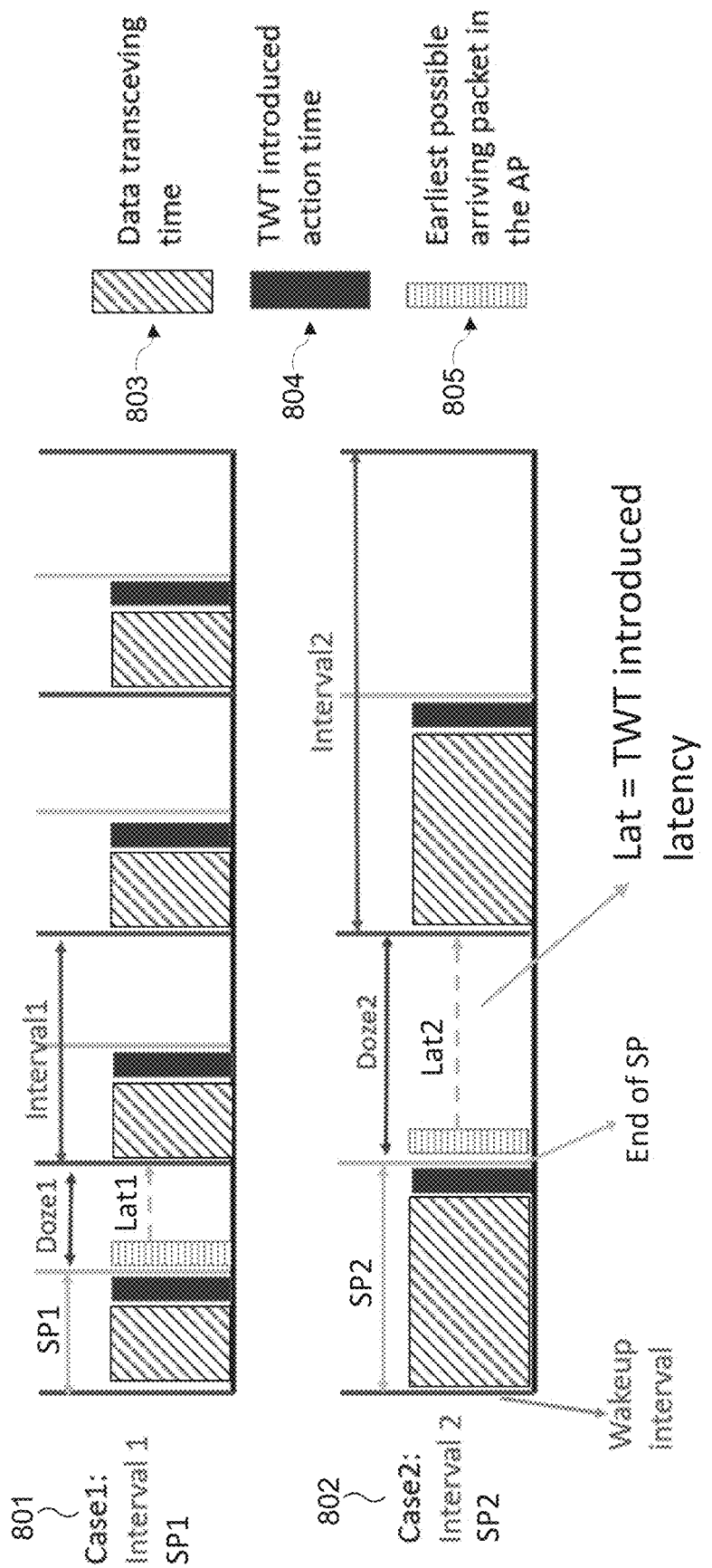
FIG. 8 illustrates a trade-off between traffic latency and TWT action-related power consumption according to embodiments of the present disclosure.

FIG. 8 illustrates a trade-off between traffic latency and TWT action-related power consumption according to embodiments of the present disclosure. As shown in FIG. 8, two TWT operation schedules 801-802 can explain the two negative effects brought by TWT operations and their trade-off relationship. As shown in FIG. 8, the interval1 and SP1 are both half of interval2 and SP2, respectively. This means the ratio of SP/Interval are the same for both schedules 801-802. Thus the maximum allowed throughput for the two TWT operation schedules 801-802 should be approximately the same. The blocks 803 represent the data transceiving time of the STA, the blocks 804 represent the additional overhead caused by TWT related actions, and the blocks 805 represent the earliest arriving packet at the AP right after the STA enters doze mode. The maximum possible traffic latencies for the two schedules 801-802 (identified as Lat1 and Lat2 in FIG. 8) caused by the TWT operation are shown as the dashed arrows. As can be seen, while the schedules 801-802 have the same maximum allowed traffic throughput, the schedule 801 has a smaller traffic latency (Lat1) than the schedule 802 (Lat2), but the schedule 802 has wasted less overhead time on TWT related actions (i.e., the total amount of the block 804) than the schedule 801.

Under the condition that the maximum served throughput remains the same, the larger TWT wakeup interval can save the total amount of additional wakeup time spent on TWT introduced actions and reduce those TWT introduced power consumption. However, a larger TWT wakeup interval can increase the maximum possible traffic latency introduced by TWT operations.

To address these and other issues, this disclosure provides a system and method for throughput-based optimization for TWT interval adjustment. As described in more detail below, the disclosed embodiments can quantitatively analyze and balance the TWT operation introduced traffic latency and power consumption, which can provide an optimal utilization of the TWT function. In particular, the disclosed embodiments can select a wakeup interval that can save power while causing limited impact to the latency of most of the traffic. Also, the disclosed embodiments can predict the incoming traffic statistics for the adjustment of the next TWT parameters. In addition, the disclosed embodiments can quickly adjust the TWT interval when a sudden change of traffic statistics is observed. This can be combined with existing or novel long-term TWT interval adjustment methods.

Figure 9:
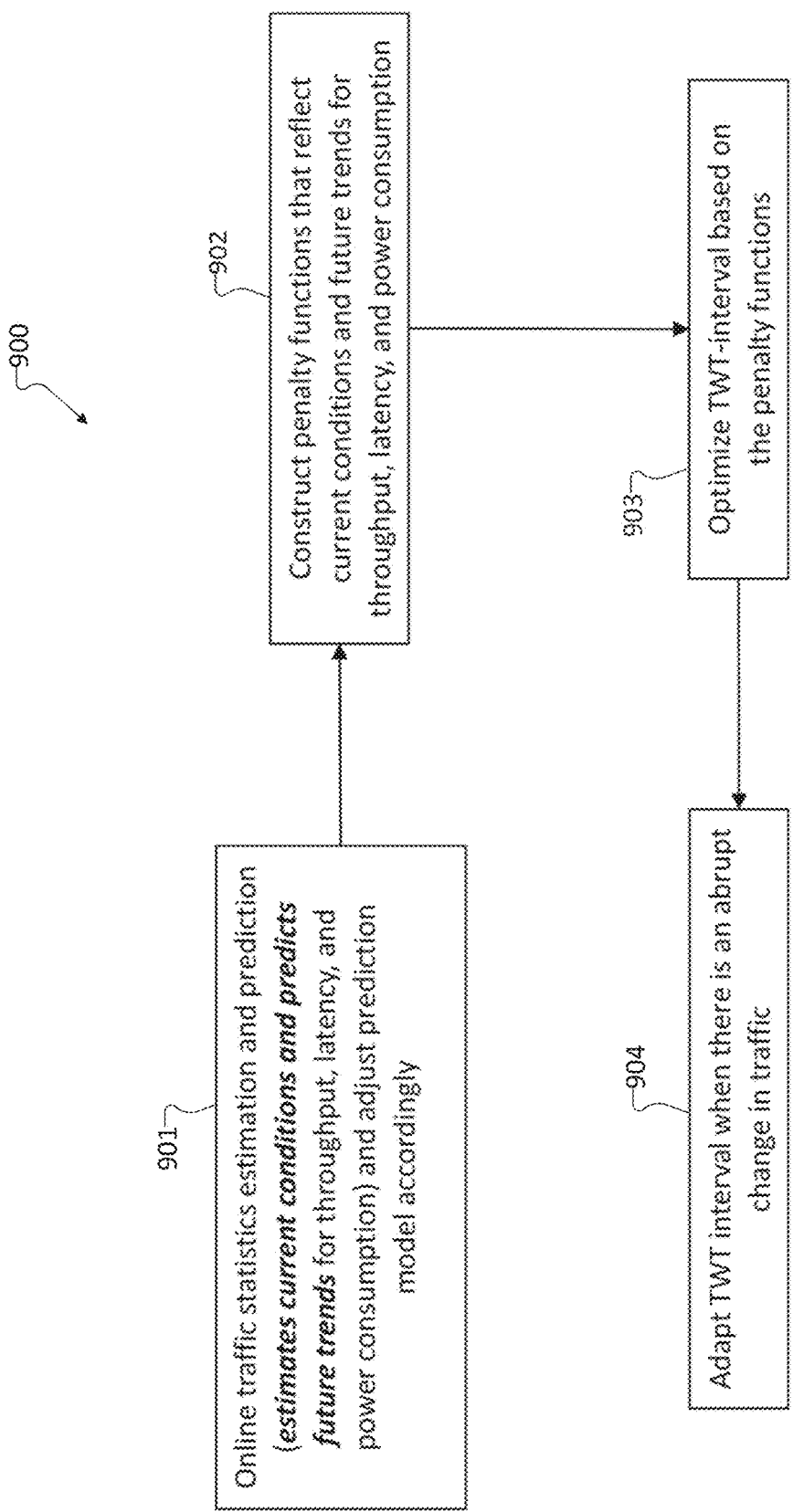
FIG. 9 illustrates an example process for throughput-based optimization for TWT interval adjustment according to embodiments of the present disclosure.

FIG. 9 illustrates an example process 900 for throughput-based optimization for TWT interval adjustment according to embodiments of the present disclosure, as may be performed by a STA (e.g., one of the STAs 111-114 as illustrated in FIG. 1). In some embodiments, the STA can perform the process 900 when the TWT is using the early termination mode. The embodiment of the process 900 shown in FIG. 9 is for illustration only. Other embodiments of the process 900 could be used without departing from the scope of this disclosure.

As shown in FIG. 9, the process 900 includes operation 901, in which the STA estimates current conditions and predicts future trends for throughput, latency, and power consumption for TWT interval adjustment, and adjusts a prediction model based on differences observed. The STA predicts the incoming traffic statistics for more accurate TWT interval adjustment. In some embodiments, the STA performs online traffic statistics estimation and prediction to obtain one or more penalty functions, as described in greater detail below. In some embodiments, the prediction model can be adjusted online based on the observed difference between predicted results and actual results.

The process 900 also includes operation 902, in which the STA constructs the penalty functions, which reflect current conditions and future trends for throughput, latency, and power consumption. The basic principle is that the TWT interval will be increased when the throughput is low, prioritizing power saving than the added latency, and the TWT interval will be decreased when the throughput is high, prioritizing reducing latency at the cost of less power saving. Multiple types of penalty functions are described herein. These penalty functions can customize the adjustment to balance the latency and power saving according to different user preference or use scenarios.

The process 900 also includes operation 903, in which the STA automatically adjusts the TWT interval based on throughput and associated penalty functions.

The process 900 also includes operation 904, in which the STA adapts the TWT interval when there is an abrupt change in traffic statistics based on one or more cool down timers. As described in greater detail below, the operation 904 can include a packet quantity based short-term TWT interval adjustment technique that can quickly adapt the TWT interval when there is an abrupt change in WiFi traffic. In some embodiments, the operation 904 can include a cool down timer technique that combines the short-term packet quantity based TWT interval adjustment technique and the long-term optimization-based TWT interval adjustment process to ensure that TWT parameters will not be adjusted too frequently.

Throughput-Based Optimization for TWT Introduced Latency and Power Consumption Trade-Off In some embodiments, an objective function containing the sum of the TWT introduced latency and power consumption can be built, and an optimization based approach can be used to optimize the objective function to balance the trade-off between TWT introduced latency and power consumption, based on the predicted traffic throughput, user preference, or any other suitable factor. In general, the optimization technique can penalize the increase of latency and the reduction of TWT introduced power consumption when the throughput is large. When the throughput is small, the optimization technique encourages the increase of latency in order to reduce the TWT introduced power consumption. Thus, when the throughput is increasing, the optimization technique can decrease the TWT interval to lower the latency at the cost of increased power consumption. When the throughput is decreasing, the optimization technique can increase the TWT interval to decrease the latency while reducing the power consumption.

Figure 10:
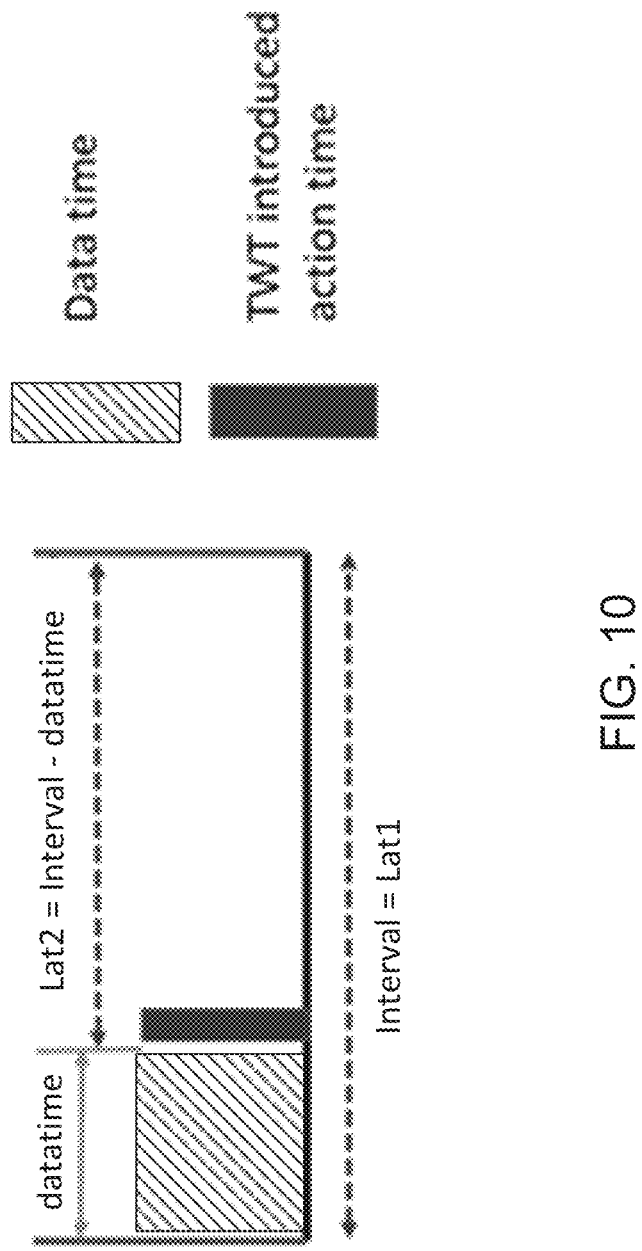
FIG. 10 illustrates examples of a latency metric for use in throughput-based optimization for TWT interval adjustment according to embodiments of the present disclosure.

To quantify the TWT introduced latency, a latency metric Lat is introduced. The metric Lat is related to the TWT interval and the SP. FIG. 10 illustrates examples of the latency metric Lat for use in throughput-based optimization for TWT interval adjustment according to embodiments of the present disclosure. In some embodiments, the latency metric Lat will be described as being implemented in the process 900 of FIG. 9. However, the latency metric Lat can be implemented in any suitable process. The embodiment of the latency metric Lat shown in FIG. 10 is for illustration only. Other embodiments of the latency metric Lat could be used without departing from the scope of this disclosure.

As shown in FIG. 10, the TWT introduced latency metric Lat can be defined in two ways, which are indicated as Lat1 and Lat2. In one way, the latency metric Lat is approximated by the TWT interval I, which is the largest possible packet latency introduced by TWT operations, as given below.

$$Lat1 \triangleq I \qquad (1)$$

In another way, the latency metric Lat is approximated by the average time difference between the TWT interval and a DataTime parameter, which is shown below.

$$Lat2 \triangleq \frac{\sum_{i=1}^{N}(I - DataTime_i)}{N} = I - I \cdot DRatio \qquad (2)$$

The index i represents one observation window time period, which can be one TWT interval. The value N is the total number of observation windows (e.g., the current TWT interval and the (N−1) previous TWT intervals). The parameter DataTime represents the time used for non-TWT data transceiving at the STA. The value DRatio is defined as the ratio between the total DataTime (e.g., within the total observation time) and the total observation time. For example, DRatio can be represented by the following:

$$DRatio \triangleq \frac{DataTime}{TotalTime} = \frac{\sum_{i=1}^{N} DataTime_i}{I * N} \qquad (3)$$

Both Lat1 and Lat2 can be used as an approximation of the TWT introduced latency to the traffic packets, while Lat1 is an upper bound of the maximum latency that TWT operation can introduce.

To quantify the TWT introduce additional power consumption and link it to the traffic throughput, a wasted power ratio (WP) metric is introduced, which can be defined as follows:

$$WP \triangleq \frac{OT}{DataTime} = \frac{OT}{I * DRatio} \qquad (4)$$

It is noted that the WP metric above is merely an example. Any monotonically decreasing function with respect to throughput (DRatio) and/or TWT-introduced latency (I) can be used.

The metric OT is the TWT function-introduced additional overhead time at the STA (e.g., the total overhead time within the total observation time), which is proportional to the additional power consumed or wasted by the TWT function. The metric WP can measure the amount of power wasted on TWT functions per unit amount of power spent on the actual traffic.

Figure 11:
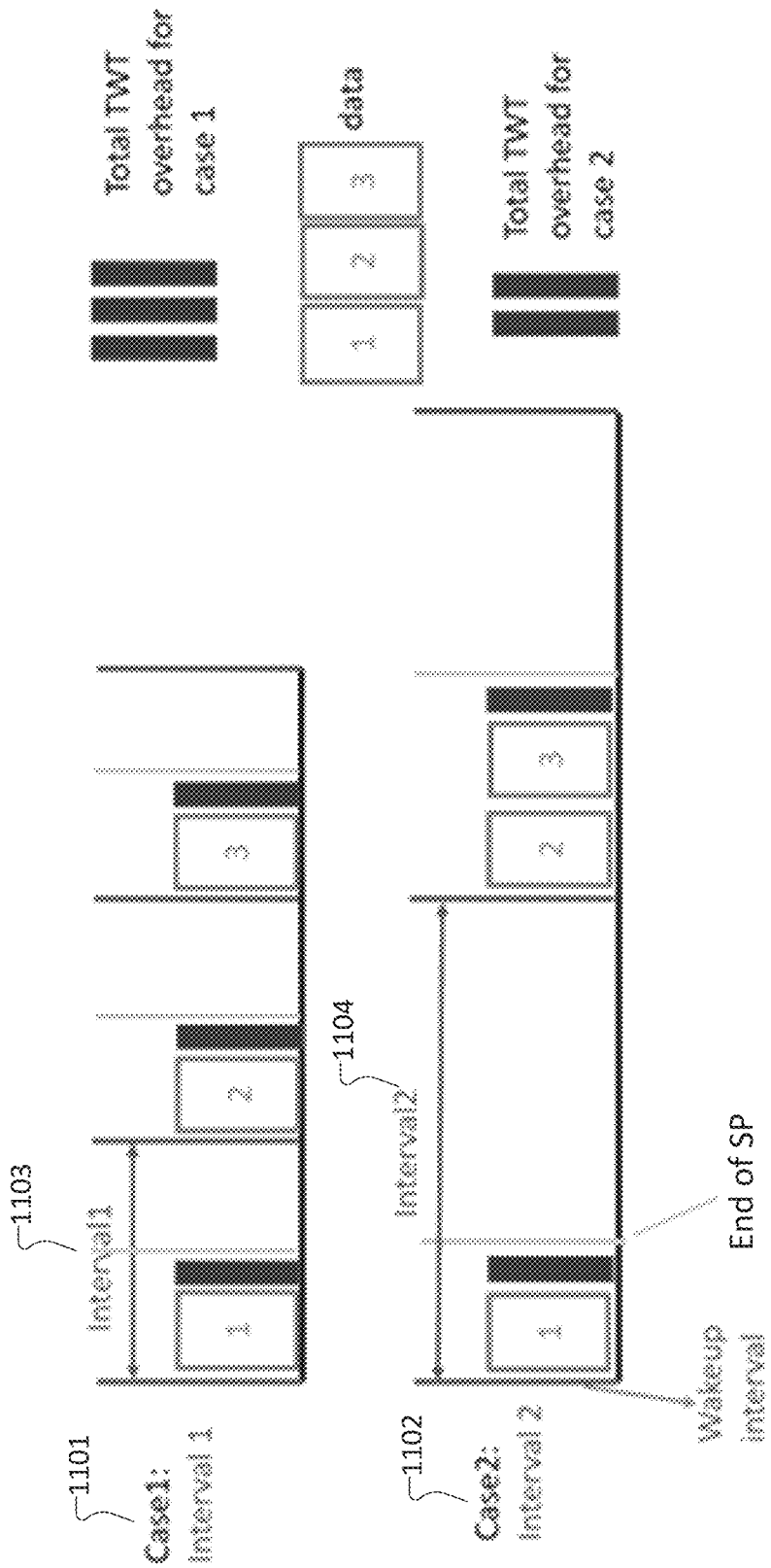
FIG. 11 illustrates a relationship between the TWT interval and TWT introduced overhead time according to embodiments of the present disclosure.

FIG. 11 illustrates a relationship between the TWT interval and TWT introduced overhead time according to embodiments of the present disclosure. As shown in FIG. 11, two TWT operation schedules 1101-1102 have different TWT intervals 1103-1104. This results in different amounts of overhead time OT. As is shown in FIG. 11, to transmit and receive the same amount of data, the larger TWT interval 1104 can introduce less additional overhead than the smaller TWT interval 1103, but at the cost that it may introduce larger latency to the data packets. Thus, a larger TWT interval can reduce the wasted power ratio at the cost of increased latency of data.

Based on the Lat and WP metrics, an objective function can be built to quantitatively represent the overall benefit and trade-off between TWT introduced latency and power consumption, which can be represented by the cost function shown below:

$$f(I) = WP + \mu * Lat \qquad (5)$$

In the cost function $f(I)$, the variable $\mu$ is a user preference based weight to determine preference of low latency or low power consumption. The value range of $\mu$ can be $\mu \geq 0$. To achieve the minimum value of the objective function under certain throughput, the optimal value of the TWT interval I can be found by solving the equation analytically or numerically, such as given below:

$$\frac{\partial f(I)}{\partial I} = 0 \qquad (6)$$

If the STA has a strict requirement on the latency, then $\mu$ should set a large value, such as 100. On the other hand, if the STA has a tight power constraint, $\mu$ should be set as a small value, such as 0.1. Of course, other values are possible and within the scope of this disclosure. The value of $\mu$ could be time-variant depending on the current traffic type, STA temperature, user preference, other suitable factors, or a combination of two or more of these.

Figure 12:
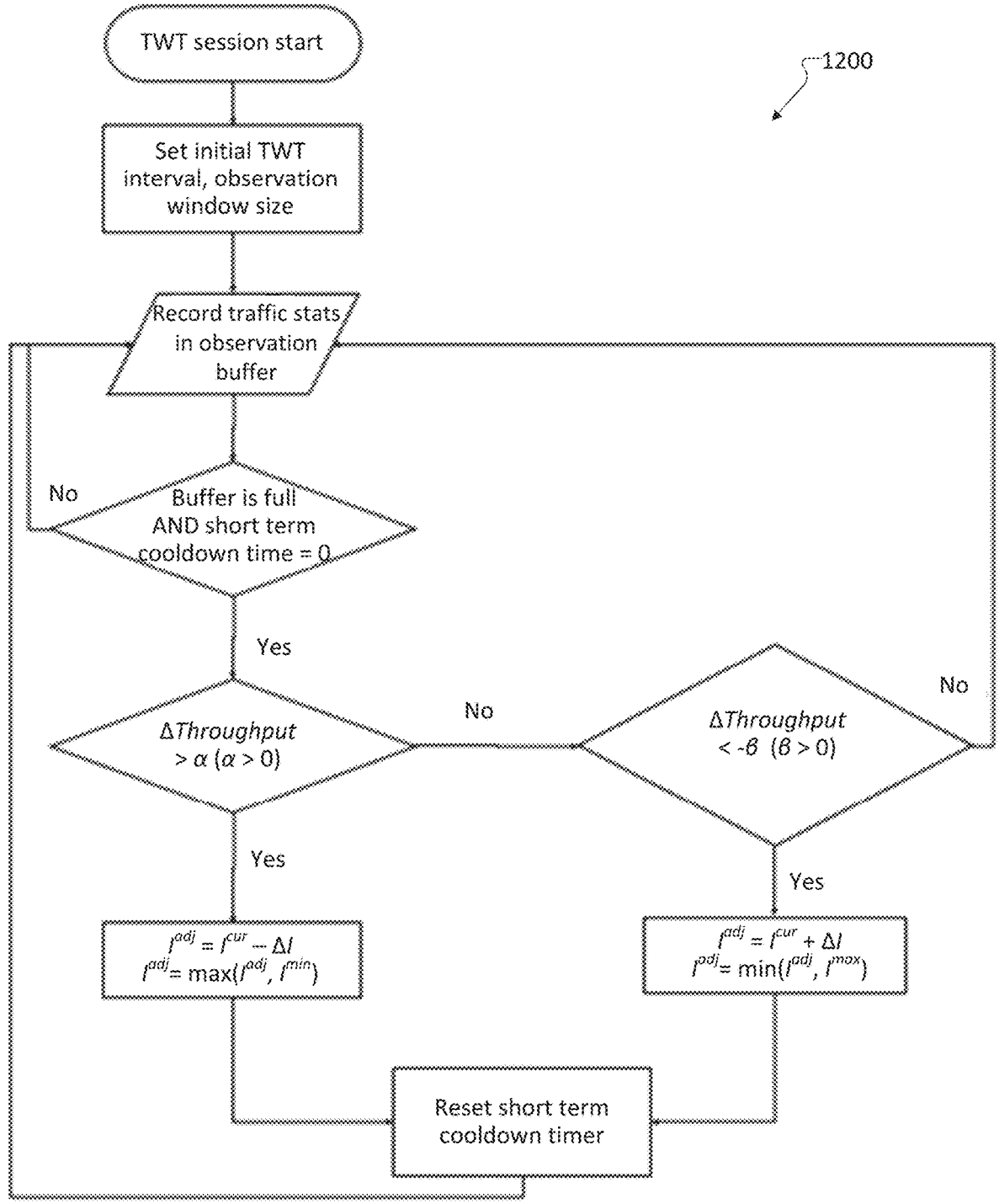
FIG. 12 illustrates an example process for throughput-based optimization for TWT interval adjustment according to embodiments of the present disclosure.

An overall principle of the designed objective function is that, when the throughput is increasing, the TWT interval can be reduced to reduce the overall TWT introduced latency at the cost of more TWT introduced power consumption. When the throughput is decreasing, the TWT interval can be increased to reduce the TWT introduced power consumption at the cost of increased overall latency. FIG. 12 illustrates an example process 1200 for throughput-based optimization for TWT interval adjustment according to embodiments of the present disclosure.

In FIG. 12, the metric ΔThroughput is the change of the throughput, $I^{cur}$ is the current TWT interval, $I^{adj}$ is the adjusted value of the TWT interval, $I^{min}$ is the minimum allowed TWT interval, and $I^{max}$ is the maximum allowed TWT interval. The values of α and represent the thresholds of the observed differential throughput that the TWT interval can be adjusted. A typical value of both α and β can be 0.1 Mbps, although other values are possible and within the scope of this disclosure. The cool down timer is used to prevent the TWT interval from being adjusted again right after one adjustment. In some embodiments, the TWT interval can be adjusted when the cool down timer is counted down or reset to 0 (or counted up to a predetermined threshold value).

Penalty Function Design for TWT Introduced Latency and Power Consumption

For specific user preferences, a penalty function can be added into the original cost function $f(I)$ given in Equation (5). The penalty function can either be added to the Lat term or the WP term or both terms in the cost function $f(I)$, depending on specific latency and power consumption requirements. Multiple types of penalty functions could be used. Three types (identified here as Type 1, Type 2, and Type 3) will now be described.

The Type 1 penalty function can be used when there is a desired latency or wasted power ratio, which is referred to herein as anchor latency or anchor wasted power ratio. The Type 1 penalty function can have increased penalty when the actual latency or wasted power ratio is moving away from the anchor latency or anchor wasted power ratio.

The Type 2 penalty function can be used when there is an absolute lower and upper bound of the TWT introduced latency or wasted power ratio. The penalty can increase when the latency or wasted power ratio is moving towards the pre-defined lower and upper bound, and the penalty can be infinitely large when reaching the lower and upper bound.

The Type 3 penalty function can be used when there is a best minimum latency or wasted power ratio, which means that there is no additional useful gain in latency or power consumption if the TWT introduced latency or wasted power ratio is smaller than the best minimum latency or wasted power ratio. Thus the penalty function is increasing only when the latency or wasted power ratio is larger than the best minimum latency or wasted power ratio.

Figure 13:
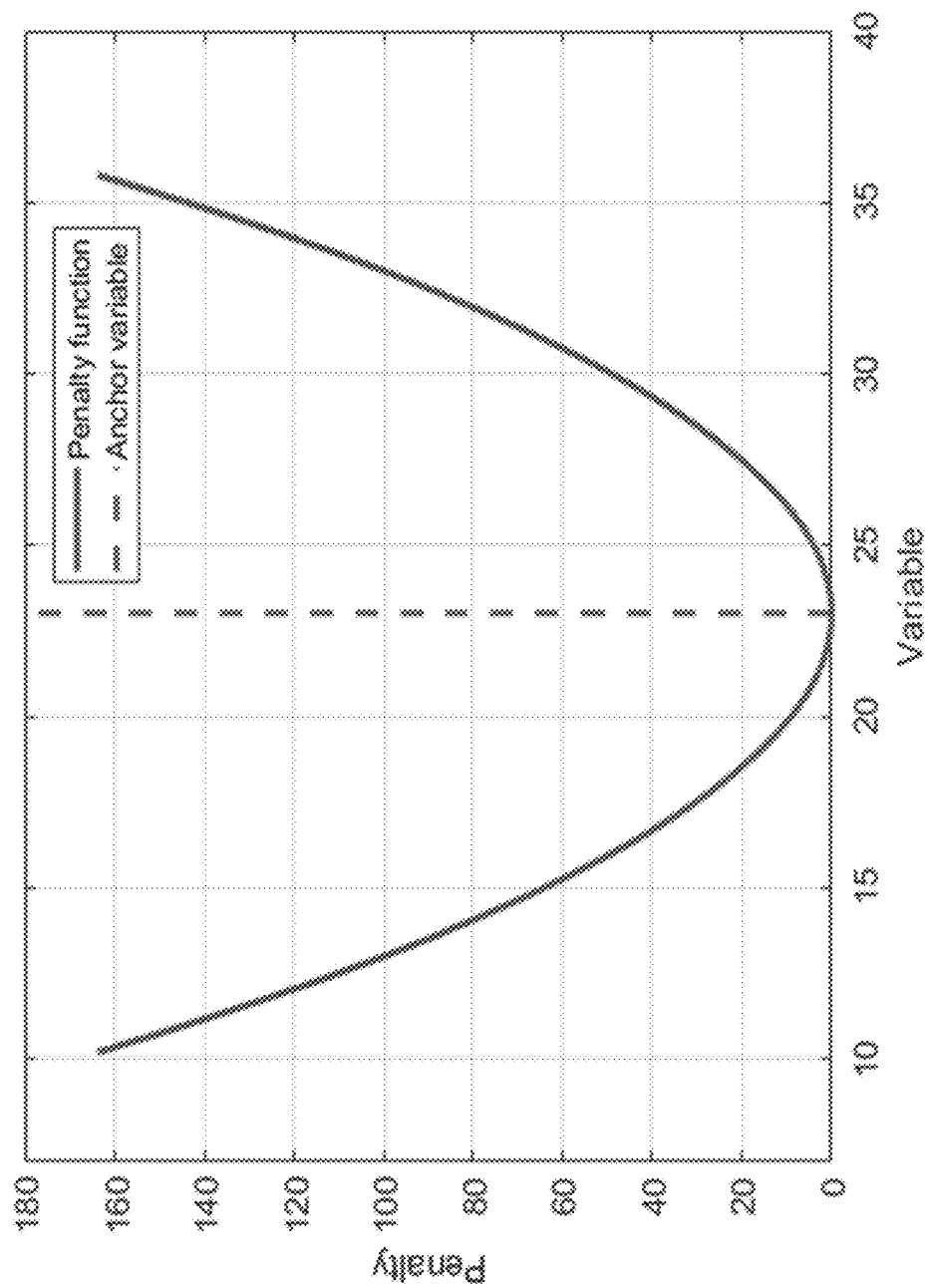
FIGS. 13 through 15 illustrate charts showing three types of penalty functions for use in throughput-based optimization for TWT interval adjustment according to embodiments of the present disclosure.
Figure 14:
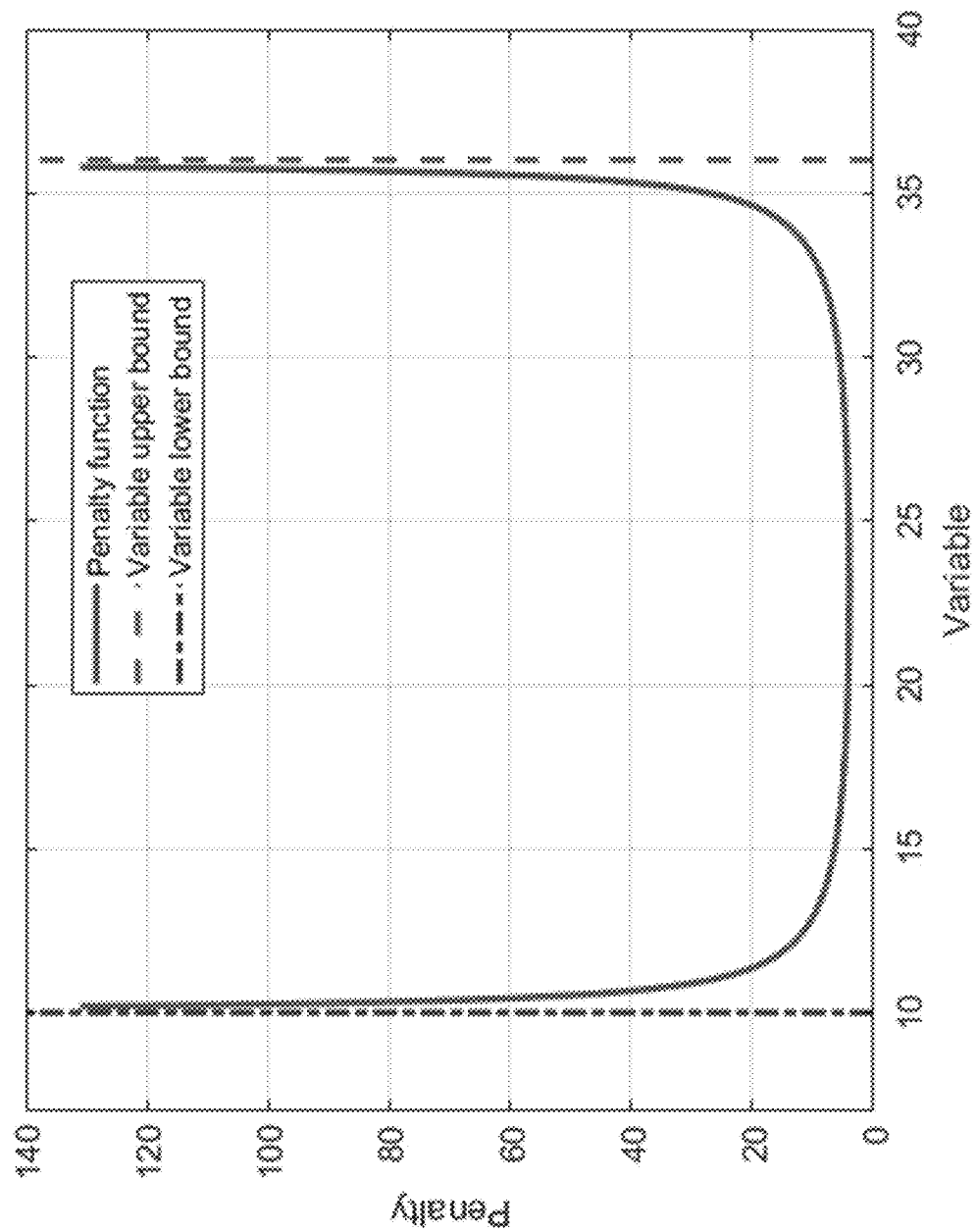
Figure 15:
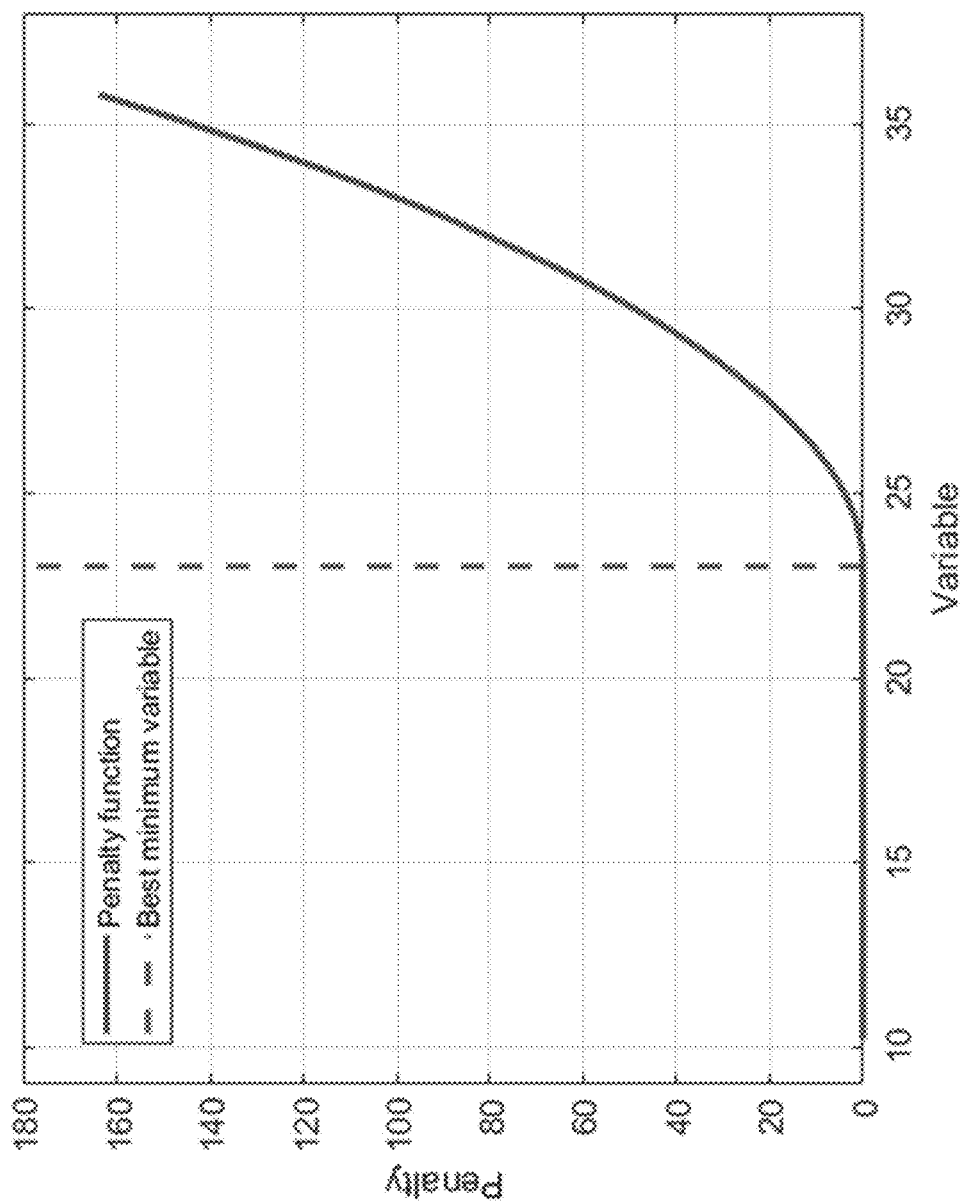

FIGS. 13 through 15 illustrate charts showing the three types of penalty functions described above. In particular, FIG. 13 illustrates the Type 1 penalty function, FIG. 14 illustrates the Type 2 penalty function, and FIG. 15 illustrates the Type 3 penalty function. In each figure, the variable can be TWT introduced latency, wasted power ratio, or TWT interval.

One embodiment of the Type 1 penalty function includes a quadratic penalty function. If a desired anchor latency L is given, then the penalty function for the latency term can be expressed as follows:

$$P_1(Lat)=(Lat-L)^2 \quad (7)$$

Similarly, if a desired anchor wasted power ratio $WP_{anchor}$ is given, then the penalty function for the wasted power ratio term can be expressed as follows:

$$Q_1(WP)=(WP-WP_{anchor})^2 \quad (8)$$

One embodiment of the Type 2 penalty function includes an inverse penalty function. If the user has a specific range of acceptable TWT added latency given as $[L_{min}, L_{max}]$, then it can be achieved using the penalty function expressed as follows:

$$P_2(Lat) = \frac{L_{max} - L_{min}}{Lat - L_{min}} - \frac{L_{max} - L_{min}}{Lat - L_{max}} \quad (9)$$

Similarly, the Type 2 penalty function for wasted power ratio with a predefined range of $[WP_{min}, WP_{max}]$ can be expressed as follows:

$$Q_2(WP) = \frac{WP_{max} - WP_{min}}{WP - WP_{min}} - \frac{WP_{max} - WP_{min}}{WP - WP_{max}} \quad (10)$$

One embodiment of the Type 3 penalty function includes a piece-wise defined function. If a best minimum latency $L_{bm}$ is provided, the penalty function can be expressed as:

$$P_3(Lat) = \begin{cases} (Lat - L_{bm})^2, & \text{if } Lat \geq L_{bm} \\ 0, & \text{if } Lat < L_{bm} \end{cases} \quad (11)$$

Similarly, given the best minimum wasted power ratio $WP_{bm}$, the Type 3 penalty function for wasted power ratio can be expressed as:

$$Q_3(WP) = \begin{cases} (WP - WP_{bm})^2, & \text{if } WP \geq WP_{bm} \\ 0, & \text{if } P < WP_{bm} \end{cases} \quad (12)$$

With the penalty functions defined above, the final objective function $f(I)$ can be expressed as a combination of the penalty functions and the Lat and the WP:

$$f(I)=\epsilon_1 \cdot Lat + \mu_1 \cdot P_1(Lat) + \mu_2 \cdot P_2(Lat) + \mu_3 \cdot P_3(Lat) + \epsilon_2 \cdot WP + \eta_1 \cdot Q_1(WP) + \eta_2 \cdot Q_2(WP) + \eta_3 \cdot Q_3(WP) \quad (13)$$

Figure 16:
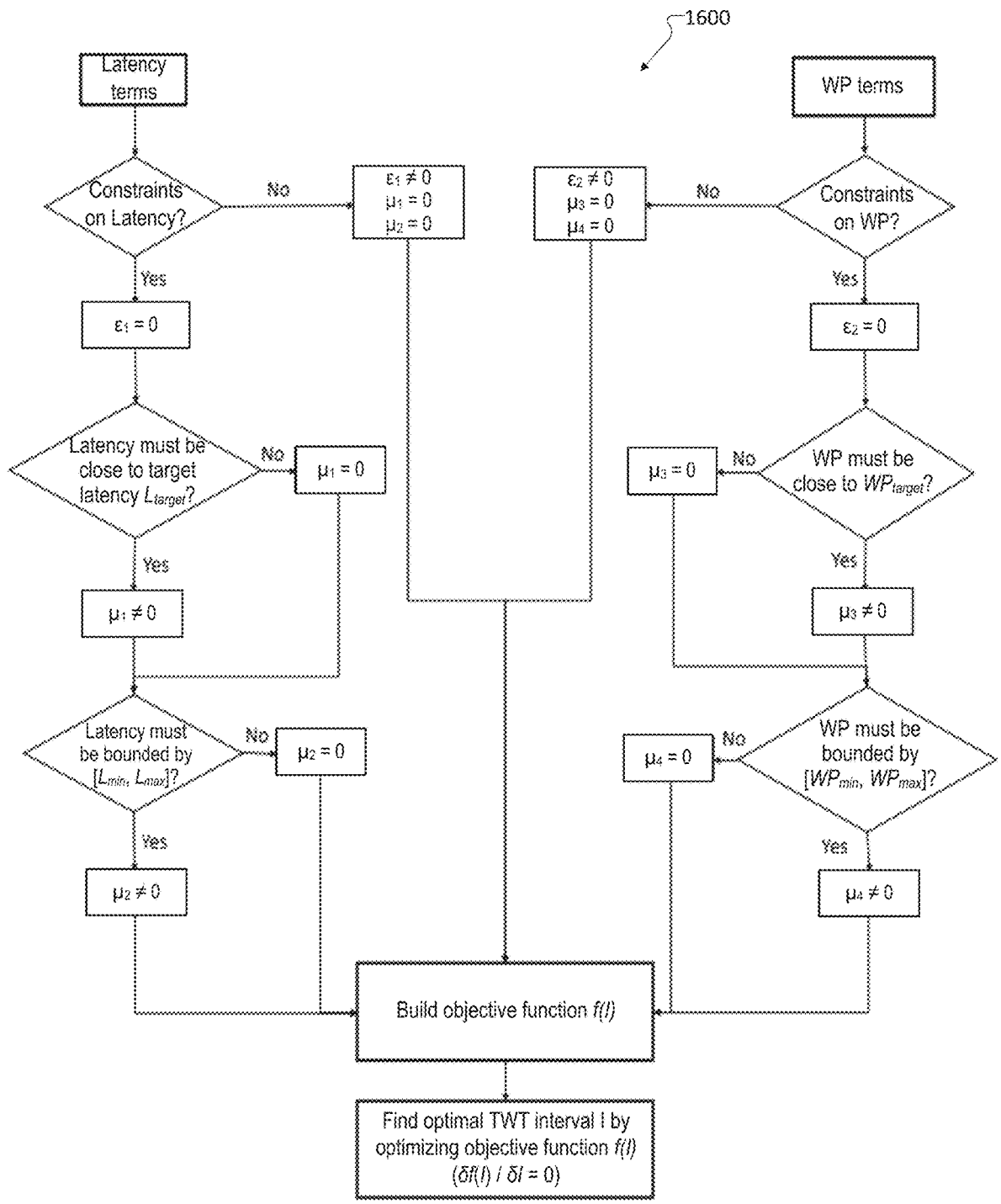
FIG. 16 illustrates an example process for building an objective function with configurable penalty functions according to embodiments of the present disclosure.

The coefficients ε, μ, and η represent weighting coefficients that can be pre-determined empirically. In some embodiments, the coefficients μ and η can be set to 0 to deactivate the corresponding penalty function term if desired. The value of the coefficients μ and η are all equal to or larger than 0. FIG. 16 illustrates an example process 1600 for building the objective function $f(I)$ with configurable Type 1 and Type 2 penalty functions, such as described above.

After building the objective function with the chosen penalty terms, in order to find the optimal interval which could minimize the objective function $f(I)$, the following equation can be solved:

$$\frac{\partial f(I)}{\partial I} = 0 \quad (14)$$

Traffic Statistics Estimation and Prediction

As discussed above, the objective function $f(I)$ is a function of the DataTime and TWT overhead time OT. Thus, to find the optimal TWT interval I for the incoming data traffic, a good estimation and prediction of the DataTime and OT is needed. There is an estimation problem and a prediction problem in finding the DataTime and OT.

First, for the estimation problem, because in many scenarios the DataTime and OT is not directly measurable, their values can only be estimated from other directly measurable traffic statistics such as total packet size, data rate, and the like. Thus a model is needed to perform such estimation.

Second, for the prediction problem, as interval to be calculated is for the future traffic pattern; future DataTime and OT need to be predicted based on the current observed traffic statistics. Thus, a method is needed to predict the future traffic statistics based on the current observed traffic statistics.

In some embodiments, the estimation problem includes an early termination case and a non-early termination case. For the early termination case, after receiving all the buffered data from the AP and transmitting all the buffered data to the AP, the STA immediately sends a packet containing the EOSP information and goes to sleep. As shown in FIG. 7 in the early termination case, during one SP, the STA wakeup time is either spent on the traffic data exchange with the AP (DataTime) or the TWT introduced overhead (OH). In FIG. 11, the TWT introduced overhead are the shaded blocks, which can include a constant overhead and a communication overhead. The TWT constant overhead time can be the same for every interval. The TWT communication overhead (comOH) is used to send and receive the TWT related control frames to and from the AP. Thus, the communication overhead time, similar to DataTime, also depends on the data rate and the congestion level to send and receive frames to and from the AP.

In one embodiment, an inverse-cca-over-radio model can be used to estimate the DataTime and TWT comOH time. For the inverse-cca-over-radio model, if the total sizes of the transmitting and receiving packets in a communication layer X are known, then the total communication time between the STA and AP to communicate all those packets in a congested environment can be expressed as:

$$TotalTime = \left(\frac{Txdata}{Txfactor \cdot Txspeed} + \frac{Rxdata}{Rxfactor \cdot Rxspeed}\right)\left(\frac{\alpha}{1 - \frac{cca}{radio}} - 1 + \alpha\right) \quad (15)$$

where Txdata and Rxdata are the transmitted and received amount of the "X" layer data in bytes (e.g., where X is any of the layers in the OSI model). The terms Txspeed and Rxspeed are the PHY layer transmitting and receiving data rate. The terms Txfactor and Rxfactor are used to map the PHY layer transmission and reception data rate to the data rate of layer X. The term cca is the channel clearance assessment time, and the term radio is the time that the STA is awake. The term $\alpha$ is a hyper-parameter, which can be tuned through calibration. The range of $\alpha$ can be 1 to 100.

Thus, the TWT introduced overhead time can be estimated as follows:

$$OT = constOH + \left(\frac{comOH_{Tx}}{Txfactor \cdot Txspeed} + \frac{comOH_{Rx}}{Rxfactor \cdot Rxspeed}\right)\left(\frac{\alpha}{1 - \frac{cca}{radio}} - 1 + \alpha\right) \quad (16)$$

where constOH is the TWT constant overhead time, $COMOH_{Tx}$ and $COMOH_{Rx}$ are the total amount of TWT communication overhead packets on the MAC layer. The terms Txfactor and Rxfactor in Equation (16) map the PHY layer data rate to the MAC layer data rate.

In some embodiments, instead of using Equation (16), OT can be approximated by $$OT = constOH \quad (17)$$

or $$OT = \left(\frac{comOH_{Tx}}{Txfactor \cdot Txspeed} + \frac{comOH_{Rx}}{Rxfactor \cdot Rxspeed}\right)\left(\frac{\alpha}{1 - \frac{cca}{radio}} - 1 + \alpha\right) \quad (18)$$

Similarly, the DataTime can be estimated in the same way using the inverse-cca-over-radio model:

$$DataTime = \left(\frac{Data_{Tx}}{Txfactor \cdot Txspeed} + \frac{Data_{Rx}}{Rxfactor \cdot Rxspeed}\right)\left(\frac{\alpha}{1 - \frac{cca}{radio}} - 1 + \alpha\right) \quad (19)$$

where $Data_{TX}$ and $Data_{RX}$ are the total transmitted and received transport layer packets size respectively. The terms Txfactor and Rxfactor in Equation (19) map the PHY layer data rate to the Transport layer data rate.

In another approach, if the timestamp of the first packet ($T_{first}$) and the timestamp of the last packet ($T_{last}$) in the SP can be observed, then DataTime can be estimated as follows.

$$DataTime = T_{last} - T_{first} + \frac{\alpha_1 \cdot Pkt_{first}}{Rxfactor \cdot Rxspeed} + \frac{\alpha_2 \cdot Pkt_{last}}{Txfactor \cdot Txspeed} \quad (20)$$

If the first packet is transmitted from the STA to the AP, then $\alpha_1=0$. If the first packet is transmitted from the AP to the STA, then $\alpha_1=1$.

If the last packet is transmitted from the STA to the AP, then $\alpha_2=1$. If the last packet is transmitted from the AP to the STA, then $\alpha_2=0$.

In another approach, if the SP can be measured from the observation, then the approaches described above can be used to estimate either OT or DataTime, and the SP can be used to calculate the other variable. If OT is first estimated, then the DataTime can be calculated as follows:

$$DataTime = SP - OT \quad (21)$$

If the DataTime is first estimated, then the OT can be calculated as follows:

$$OT = SP - DataTime \quad (22)$$

Figure 17:
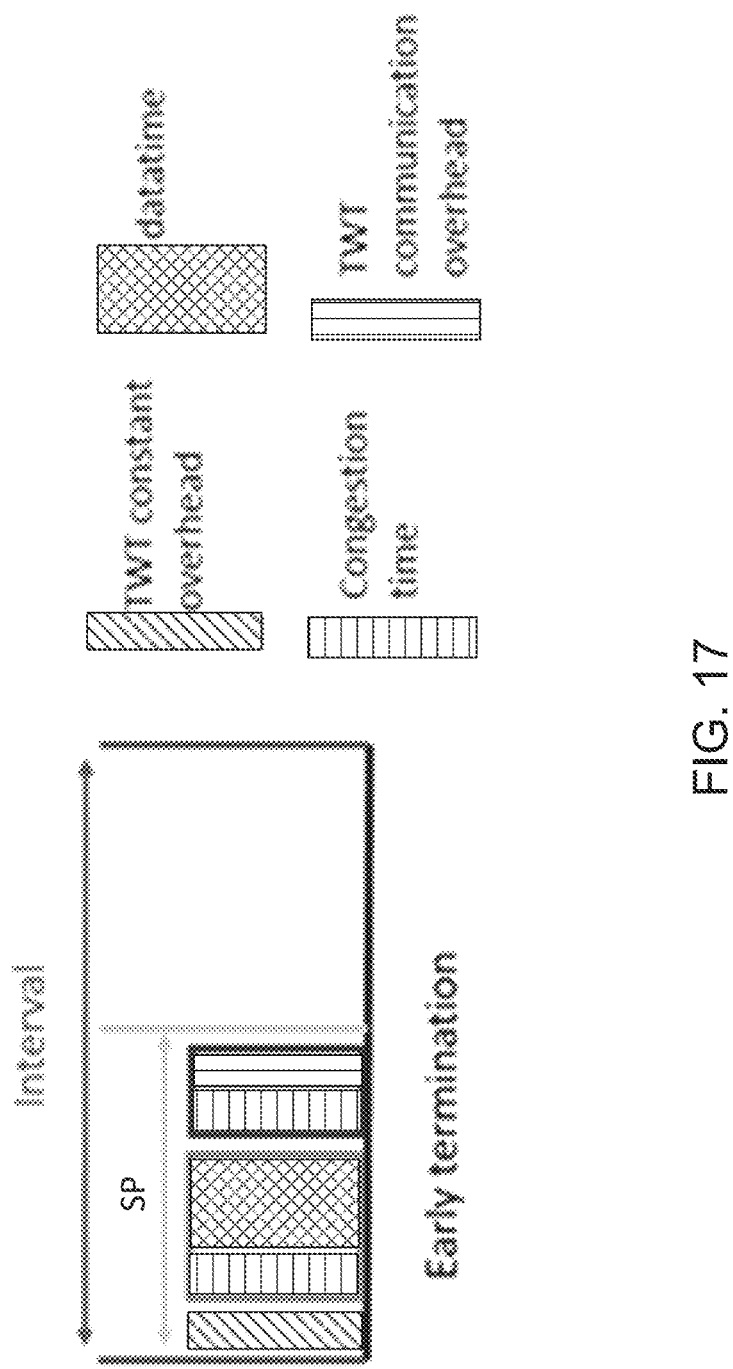
FIGS. 17 and 18 illustrate examples of an early termination case and a non-early termination case in TWT according to embodiments of the present disclosure.
Figure 18:
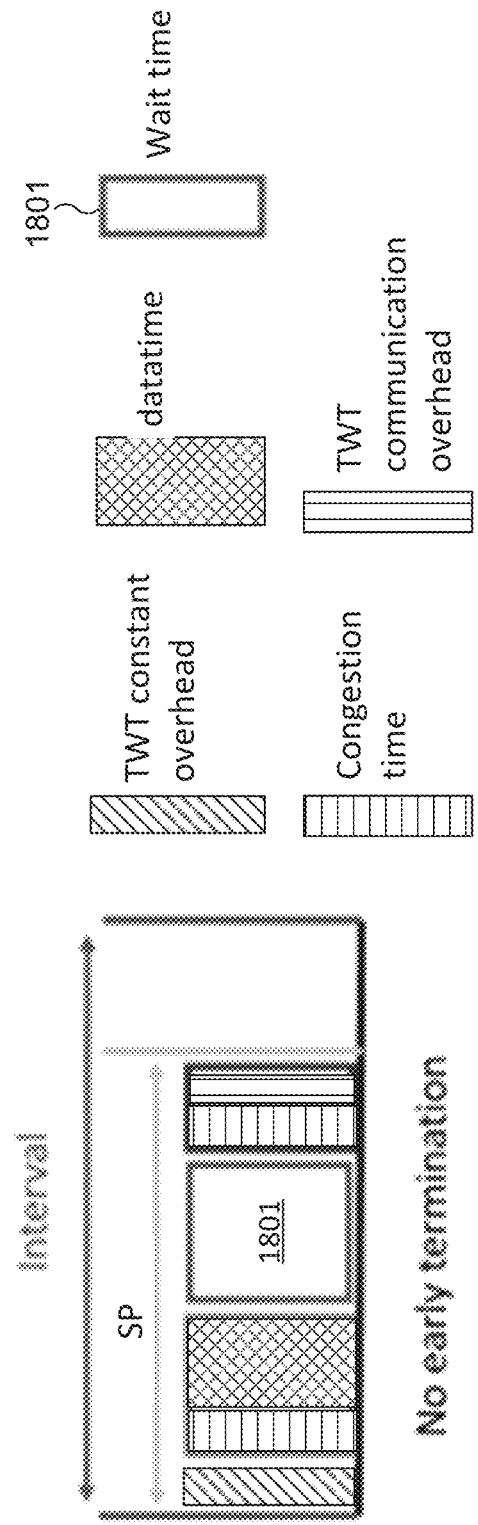

For the non-early termination case, the SP is pre-determined, and there can be a waiting time period in which the STA is awake but there is neither TWT related action nor data communication with the AP. The same approaches listed in the early termination case can also be used to estimate the DataTime and OT here. FIGS. 17 and 18 illustrate examples of the early termination case and the non-early termination case, respectively. FIG. 18 shows a waiting time period 1801 for the non-early termination case, which is not present in the early termination case.

For the prediction problem, the future traffic statistics can be predicted based on the current observed traffic statistics. The exemplary traffic statistics can include (but are not limited to) throughput, packet quantity (i.e., number of packets transmitted or received), DataTime (as given by Equation 21), and the like.

Figure 19:
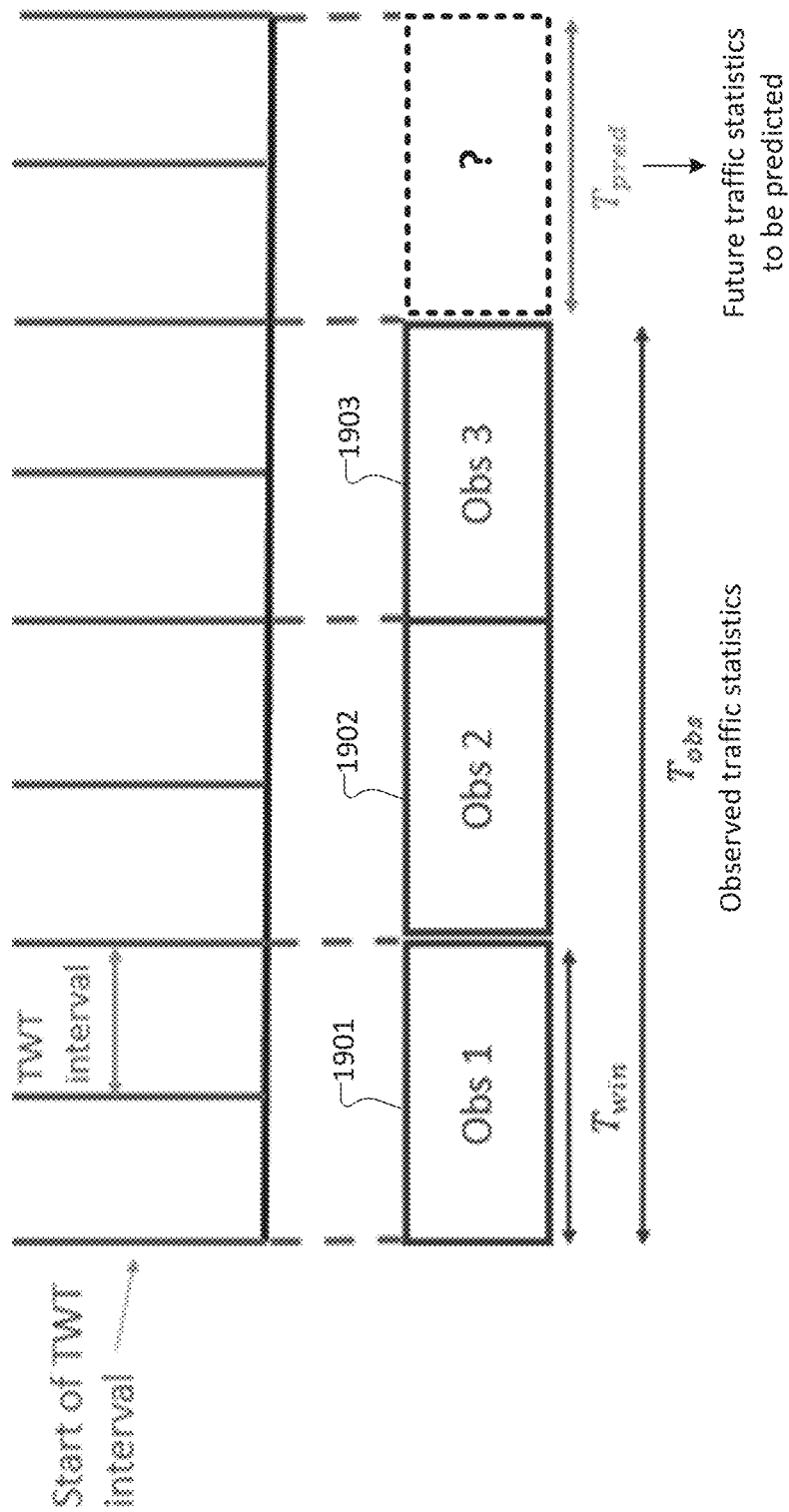
FIG. 19 illustrates observation windows that can be used during a time series prediction according to embodiments of the present disclosure.

FIG. 19 illustrates observation windows that can be used during a time series prediction according to embodiments of the present disclosure. As shown in FIG. 19, the observation period can consist of N observation windows 1901-1903. In FIG. 19, N=3, but other values are possible and within the scope of this disclosure (e.g., N=5). Each observation window 1901-1903 can have an observation time length of $T_{win}$. The total observation time is $T_{obs}=N \cdot T_{win}$. An example value of $T_{win}$ is 0.5 s, but other values are possible and within the scope of this disclosure. The traffic statistics $X_{stat}$ within each observation window 1901-1903 can be measured and recorded; such traffic statistics can include (but are not limited to) the packet quantity, packet size, inter-packet time, throughput, and the like. From the collected traffic statistics of the N observation windows, a time series of $X_{stat}$ can be determined, which can be used to predict $X_{stat}$ in a period of time $T_{pred}$ in the future. In some embodiments, $T_{pred} = T_{win}$ to ensure that the predicted traffic statistics and each observed traffic statistics are on the same time scale.

As shown in FIG. 19, the start of the observation window 1901-1903 can align with the start of the TWT service period. The observation window size can be a multiple of the TWT interval, where $T_{win}=m \cdot I$ and m can be any positive integer. If m>1, then the observed traffic statistics $X_{stat}^{cur}$ in the current observation window 1901-1903 could be equal to sum of the traffic statistics over m TWT intervals normalized by the observation window size $T_{win}$. The traffic statistics recorded in each observation window 1901-1903 can be a data point for the time-series estimation.

In some embodiments, any of the six following approaches can be used to perform the traffic statistics prediction. The first two approaches use non-parametric models. The next four approaches use parametric models, where the parameter of the model is pre-determined or learned in the real time. Of course, any other suitable approach can be used to perform the traffic statistics prediction.

In the first approach, a last value prediction method can be used. In this case, only one observation window is used, where the observation window size $T_{win}=m \cdot I$. The observed current traffic statistics is $X_{stat}^{cur}$. Then the $X_{stat}^{pred}$ during $T_{pred}$ can be predicted as follows:

$$X_{stat}^{pred}=X_{stat}^{cur} \quad (23)$$

In the second approach, a mean value prediction method can be used. A total number of N observation windows can be used where the observation window size $T_{win}=m \cdot I$. Then the $X_{stat}^{pred}$ can be calculated as follows:

$$X_{stat}^{pred} = \frac{\sum_{i=1}^{N} X_{stat}^{i}}{N} \quad (24)$$

In the third approach, an exponentially weighted average (EWA) model can be used for the prediction. This model assumes that more distant past observations have fewer correlations to the prediction results, and thus an exponentially smaller weight is assigned to the observations pred further away from the prediction time. The $X_{stat}^{pred}$ can be calculated as follows:

$$X_{ewa}^{1}=X_{stat}^{1}(i=1) \quad (25)$$

$$X_{ewa}^{i+1}=(1-\gamma)X_{ewa}^{i}+\gamma X_{stat}^{i}(N>i>1) \quad (26)$$

$$X_{stat}^{pred}=(1-\gamma)X_{ewa}^{N}+\gamma X_{stat}^{N} \quad (27)$$

where i is the observation window index, N is the total number of observation windows, and γ is between 0 to 1. The value $X_{ewa}$ is the exponentially weighted average of $X_{stat}$.

In the fourth approach, a double exponential smoothing model can be used, which can make a more accurate prediction when the traffic statistics has an increasing trend or decreasing pred trend. The $X_{stat}^{pred}$ can be calculated as follows:

$$S^{i}=\alpha X_{stat}^{i}+(1-\alpha)(S^{i-1}+b^{i-1})(N>i>1) \quad (28)$$

$$b^{i}=\gamma(S^{t}-S^{i-1})+(1-\gamma)b^{i-1}(N>i>1) \quad (29)$$

$$X_{stat}^{pred}=S^{N}+b^{N} \quad (30)$$

In some embodiments, $b^{1}=y^{2}-y^{1}$, and $S^{1}=y^{1}$, where $y^{2}$ and $y^{1}$ are the observed statistics in the first and second observation windows. The values for α and γ can be in the range of 0 to 1. The index i is the observation window index, and N is the total number of observation windows.

In the fifth approach, a triple exponential smoothing model can be used. This model can provide a good prediction when the traffic statistics have an increasing or decreasing trend feature or a periodic feature.

In the sixth approach, an auto regression integrated moving average (ARIMA) model can be used. The ARIMA model is a more general model that can account for non-stationary mean, trending, and periodic features.

Figure 20:
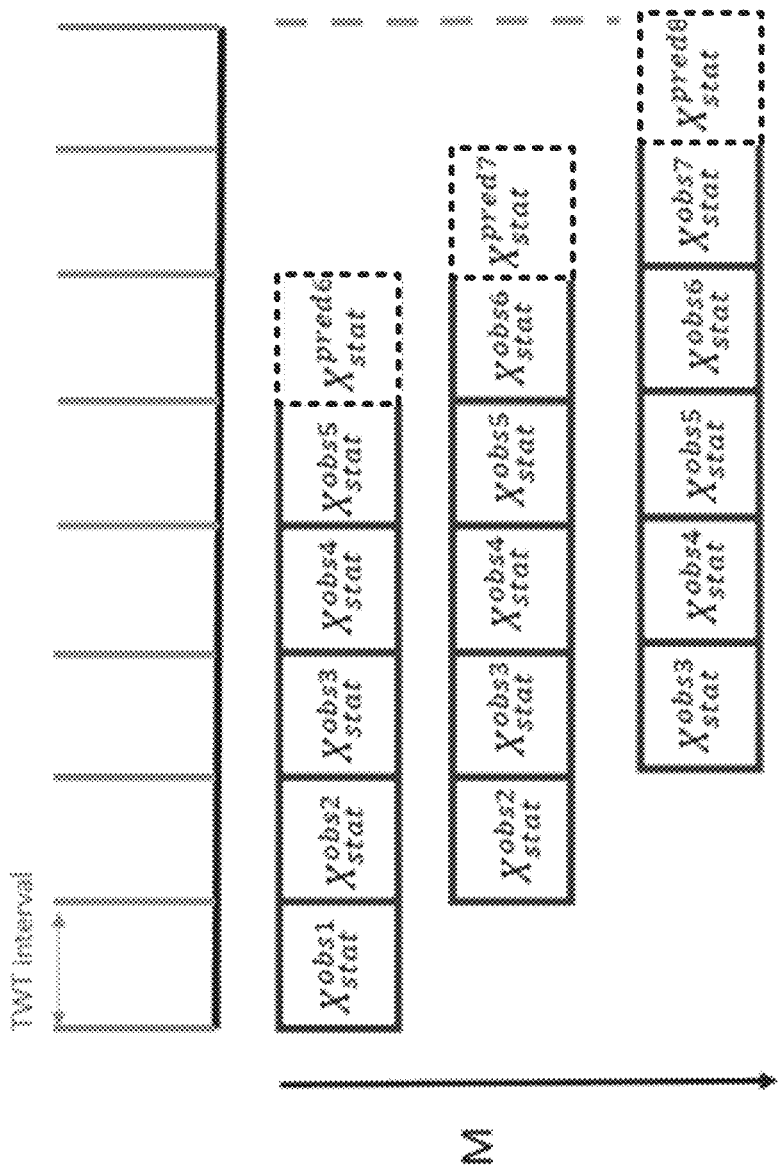
FIG. 20 illustrates an example use of a time series prediction model according to embodiments of the present disclosure.
Figure 21A:
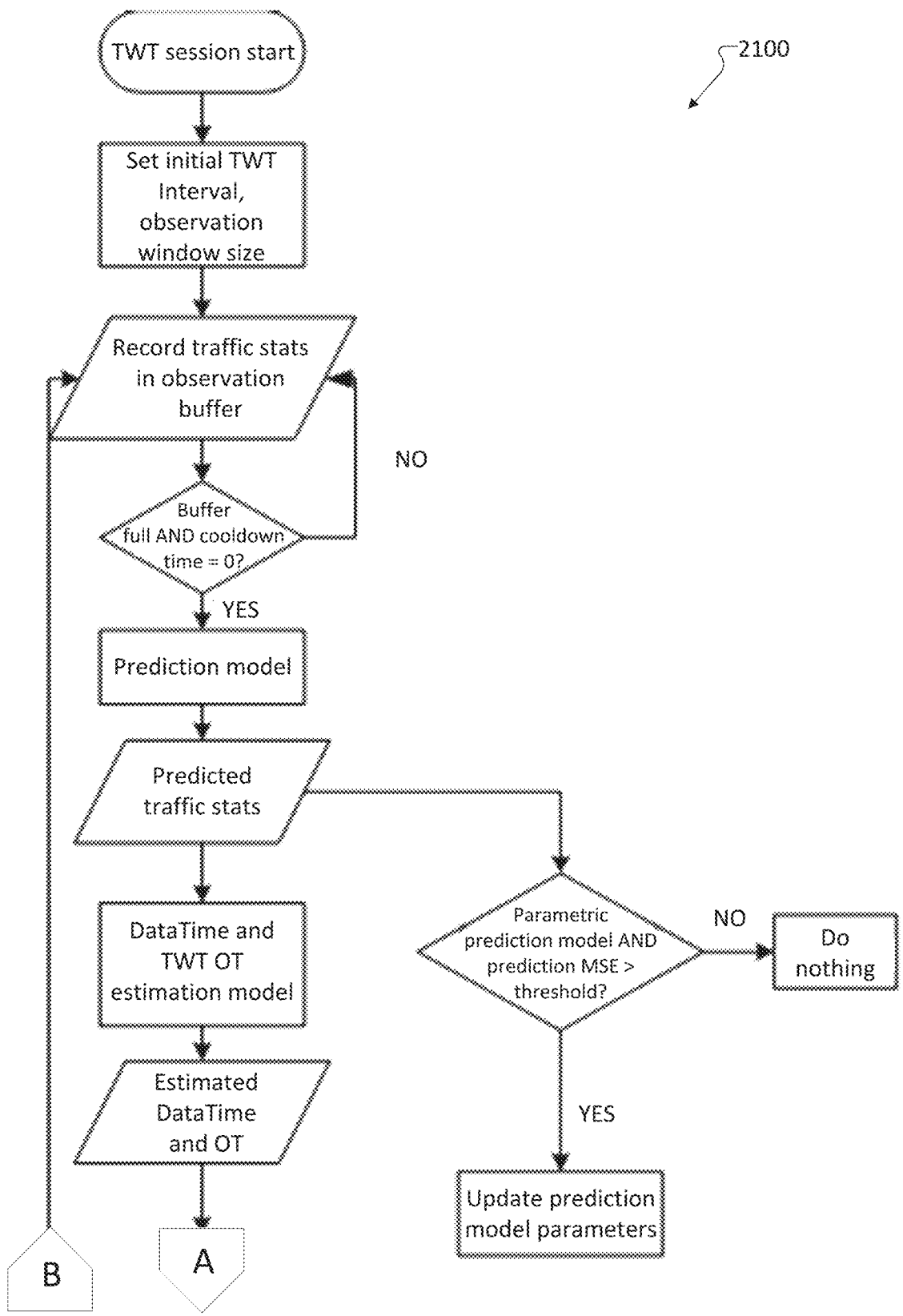
FIGS. 21A and 21B illustrates an example throughput based TWT interval adjustment method according to embodiments of the present disclosure.
Figure 21B:
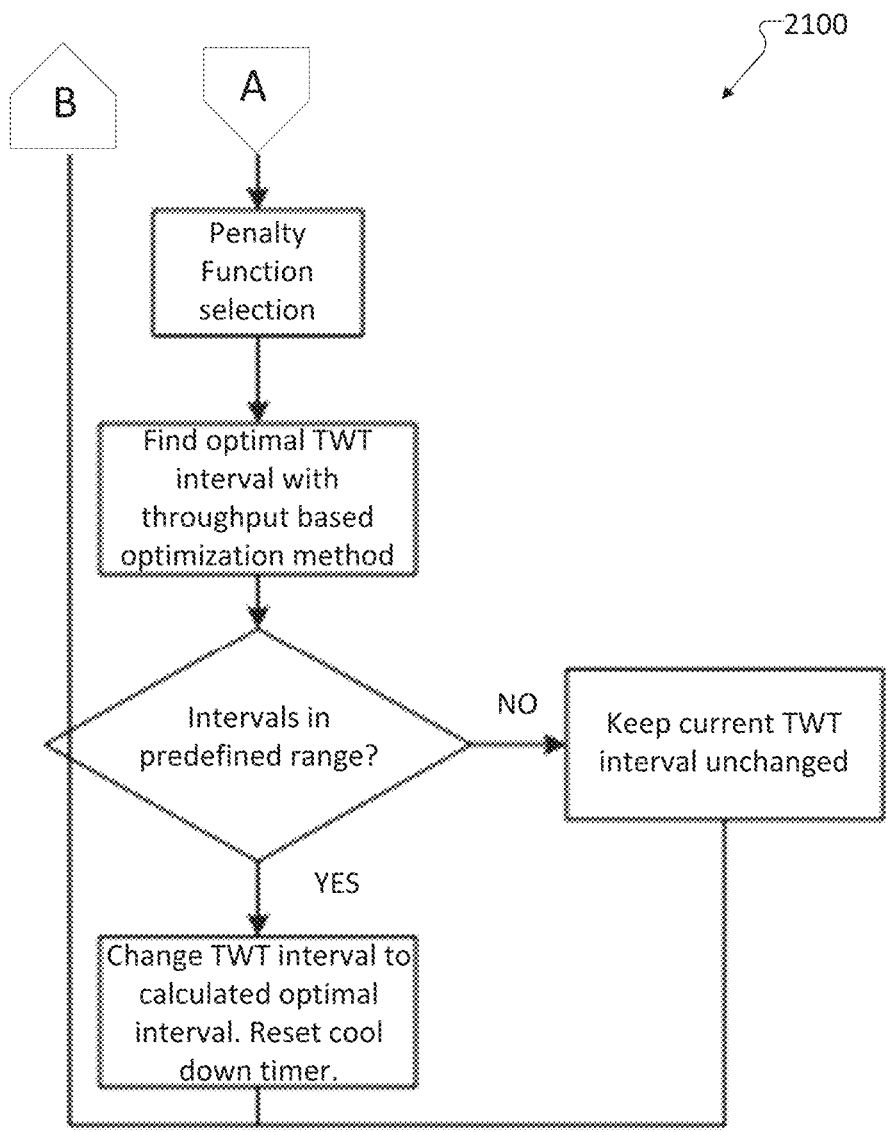

The parameters of the parametric time series prediction model can be pre-determined or learned with observations. FIG. 20 illustrates an example use of the time series prediction model according to embodiments of the present disclosure. As shown in FIG. 20, the observed traffic statistics $X_{stat}^{obs}$ of each observation window can be stored in a size N FIFO buffer. With N $X_{stat}^{obs}$ in the observation buffer and a time series prediction model, the $X_{stat}^{pred\ i}$ of the next time window i can be predicted. Then in the next observation, the actual traffic statistic value $X_{stat}^{obs\ i}$ of time window i can be observed. The mean squared error (MSE) can be calculated as $(X_{stat}^{obs\ i}-X_{stat}^{pred\ i})^{2}$. Then, the MSE of M consecutive predictions can be expressed as:

$$Err = \frac{\sum_{i=1}^{M}\left(X_{stat}^{predi} - X_{stat}^{obs\ i}\right)^{2}}{M} \quad (31)$$

If the value of Err is larger than a predetermined threshold, then the parameters of the prediction model can be updated through solving a nonlinear optimization problem to minimize Err.

A flowchart of a throughput based TWT interval adjustment method 2100 such as described above is shown in FIGS. 21A and 21B.

Combination of Long Term and Short Term TWT Interval Adjustments

The embodiments described above provide a throughput-based optimization approach to adjust the TWT interval to achieve a balance of TWT introduced latency and power consumption. The throughput-based optimization approach usually is used to adjust the TWT interval based on traffic statistics collected over a relatively long observation time $T_{obs1}$, which can consist of $N_1$ TWT intervals. Otherwise, the fluctuation of the DataTime and OT in a short observation time can result in a too frequent adjustment of the TWT interval. The throughput-based optimization approach is referred to herein as the long term TWT interval adjustment method due to its long observation time.

However, in some situations, if certain specific traffic patterns are observed even after a short observation, the TWT interval adjustment decision can be immediately justified. For example, when the STA is put to rest, there can be no data exchange between the STA and AP, which can result in an observation that zero packets are transmitted or received in several consecutive observation windows. Thus the TWT interval can be immediately increased in this scenario. In another example, when the STA is woke up by the user and the user immediately starts to do video streaming (or another high throughput activity), consecutive high duty cycle and throughput can be observed in several observation windows. In this scenario, the TWT interval can be immediately reduced from a large value. This consecutive same traffic pattern based approach is referred to herein as the short term TWT interval adjustment method, due to the fact that the total observation time needed to make the interval adjustment decision can usually be short.

Similar to the long term adjustment method, the short term adjustment method can also be based on the traffic statistics of several observation windows, each of which can have a time length of $T_{win}^{short}$. For example, the time length can be expressed as:

$$T_{win}^{short} = m \cdot I \quad (32)$$

where m is a positive integer and I is the current TWT interval. The total observation time $T_{obs}^{short} = N_2 T_{win}^{short}$. The coefficient $N_2$ corresponds to a quantity of observation windows, and can be equal to:

$$N_2 = \text{floor}\left(\frac{T_{obs}^{predefined}}{T_{win}^{short}}\right) \quad (33)$$

or $$N_2 = \text{ceiling}\left(\frac{T_{obs}^{predefined}}{T_{win}^{short}}\right) \quad (34)$$

where $T_{obs}^{predefined}$ is a predefined observation time. A sample value of $T_{obs}^{predefined}$ can be 500 ms, although other values are possible and within the scope of this disclosure.

During the observation stage, the $N_2$ observation windows can form a size $N_2$ FIFO observation buffer. The two conditions to immediately increase or decrease the TWT interval are listed as follows. First, if the number of packets is zero in the $N_2$ observation windows, then the TWT interval I can be immediately increased as follows:

IF $pktNum_i=0 (i=1,2,\ldots N_2)$:

THEN: $I^{adj}=I^{cur}+\alpha^k \cdot \Delta I$ $I^{adj}=\min(I^{adj}, I^{max})$ where $I^{adj}$ is the adjusted value of the interval, $I^{cur}$ is the current value, $\Delta I$ is the interval adjustment step size, a is a pre-defined parameter to determine the adjustment speed, $I^{max}$ is a predefined maximum value of the interval, and k is the number of times that the short term TWT interval increasing condition is consecutively triggered. The parameter $\alpha$ can satisfy the condition that $\alpha \geq 1$. The parameter k can help boost the speed of increasing the interval. An example set of values for $I^{cur}$, $\Delta I$, $\alpha$, and k are 30 ms, 5 ms, 1.1 and 2, respectively, although other values are possible and within the scope of this disclosure.

When zero packets are observed consecutively, it is a strong indicator that the STA is not currently exchanging any data with AP. Thus, this imminent opportunity can be exploited to increase the TWT interval and save power without hurting the traffic latency. Second, if the duty cycles in all the $N_2$ observations windows are higher than a pre-defined $DutyCycle^{threshold}$ and the current interval is larger than a pre-defined $I^{threshold}$ (which indicates that the STA was previously in an ultra-low throughput condition), then the TWT interval can be immediately reset to a predefined small value $I^{small}$ to reduce its added latency to the current high traffic, such as by the following:

IF($I^{cur} > I^{threshold}$ AND
    $DutyCycle_i > DutyCycle^{threshold}$)$i=1,2,\ldots N_2$:

THEN: $I^{adj}=I^{small}$

Figure 22:
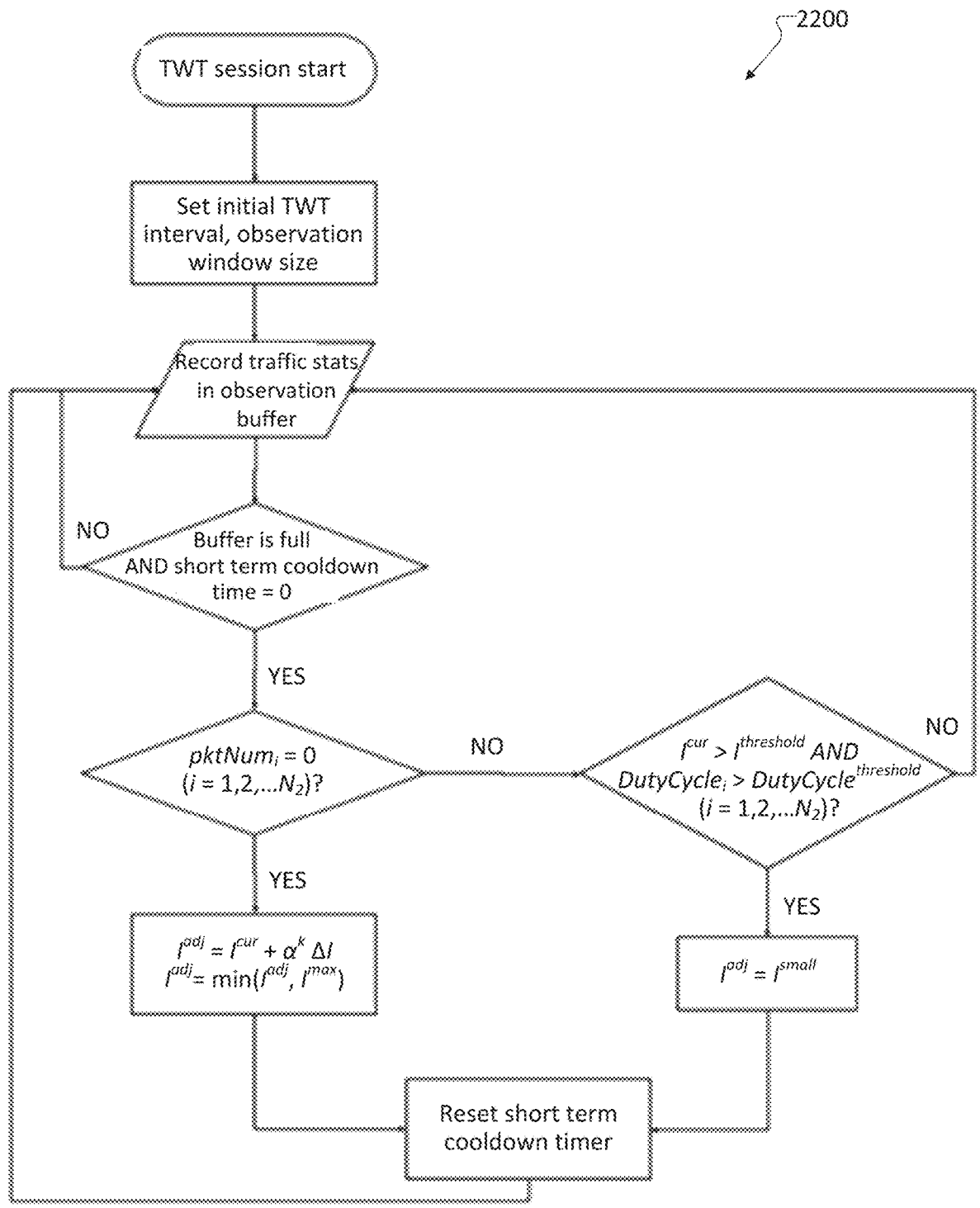
FIGS. 22 and 23 illustrate example short term TWT interval adjustment methods according to embodiments of the present disclosure.

A flowchart illustrating a process 2200 of the overall short term TWT adjustment using the two methods above is shown in FIG. 22.

In other embodiments, a different short term TWT interval adjustment method for reducing the TWT interval is listed below:

IF($I^{cur} > I^{threshold}$ AND
    $DutyCycle_i > DutyCycle^{threshold}$)$i=1,2,\ldots N_2$:

THEN: $I^{adj}=I^{cur}-\alpha^k \cdot \Delta I$ $I^{adj}=\max(I^{adj}, I^{min})$ where $I^{adj}$ is the adjusted value of the interval, $I^{cur}$ is the current value, $\Delta I$ is the interval adjustment step size, a is a pre-defined parameter to determine the adjustment speed, $I^{min}$ is a predefined minimum value of the interval, and k is the number of times that the short term TWT interval decreasing condition is consecutively triggered. The parameter $\alpha$ can satisfy the condition that $\alpha \geq 1$. The parameter k can help boost the speed of increasing the interval. An example set of values for $I^{cur}$, $\Delta I$, $\alpha$, and k are 30 ms, 5 ms, 1.1 and 2, respectively, although other values are possible and within the scope of this disclosure.

In other embodiments, a different short term TWT interval adjustment method for increasing the TWT interval is listed below:

IF($pktNum_i=0$)$i=1,2,\ldots N_2$:

THEN: $I^{adj}=I^{large}$ which means that if the number of packets in the size $N_2$ observation buffer is zero, then the TWT interval can be immediately increased to a pre-defined value of $I^{large}$.

Figure 23:
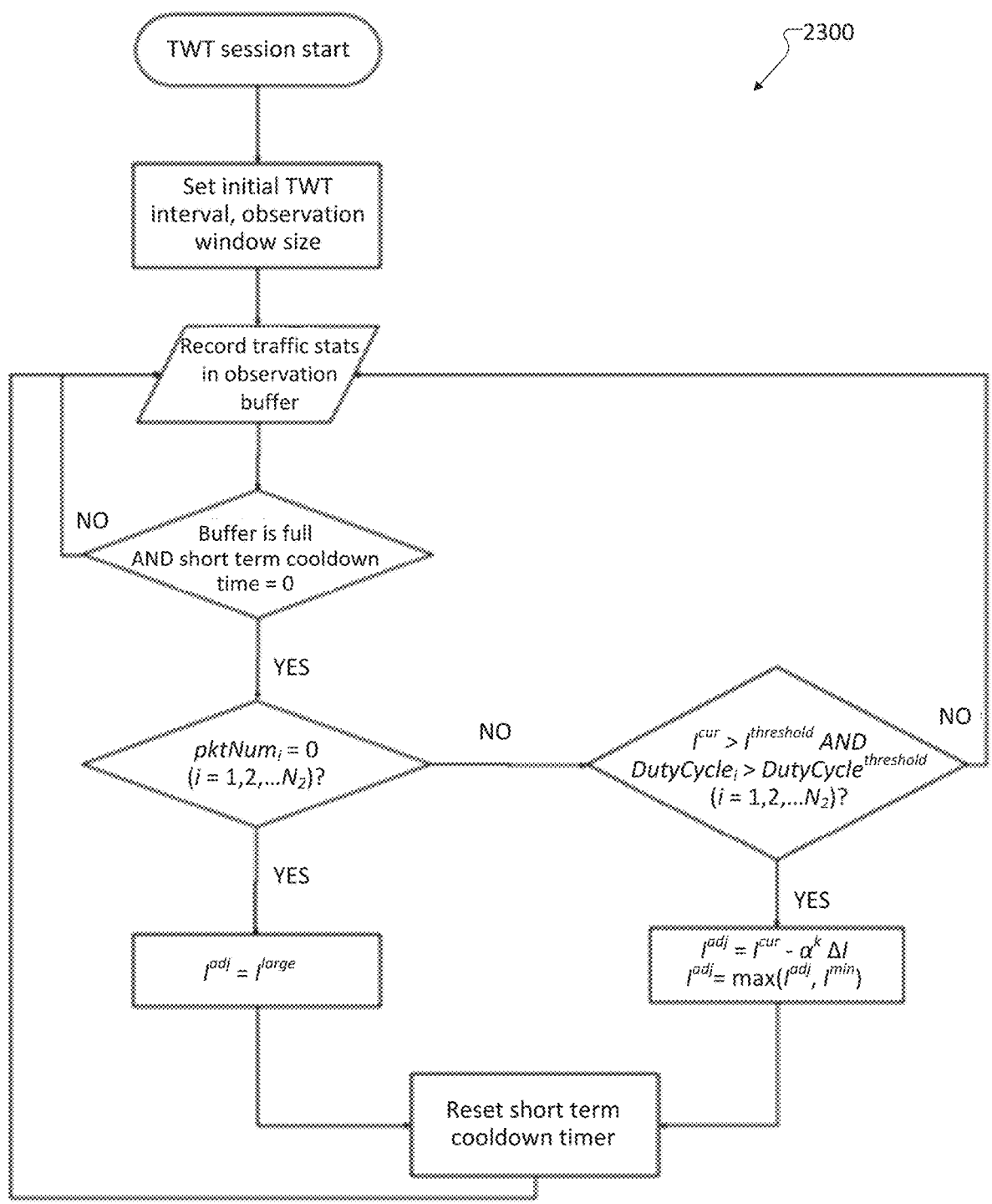

A flowchart illustrating a process 2300 of the short term TWT interval adjustment using the two methods above is shown in FIG. 23.

It is noted that the short term adjustment condition is much harder to meet than the long term adjustment condition, which is controlled by the variation of the wasted power ratio. Thus, though the short term adjustment condition can be checked more frequently, it may not trigger TWT interval adjustment more often than the long term TWT interval adjustment method.

The short term and long term interval adjustment method can also be combined together. However, it is preferable to avoid the situation that one short or long term interval adjustment is triggered right after another long or short interval adjustment. This is because the effects of the interval adjustment on the traffic statistics can take some time to be observed. Thus, a cool down technique can be used in which each of the short term adjustment and long term adjustment can have its own cool down timer. In some embodiments, the short and long term adjustment method can be designed such that eligibility to adjust the interval occurs only when the corresponding cool down timer has counted down from a predefined value to 0 (or alternatively counted up to a predefined value). Whenever a TWT interval adjustment action happens, both the short term and long term adjustment method cool down timers will be reset to the pre-defined value to restart the cool down. The pre-defined values for the two timers could be either same or different.

Figure 24A:
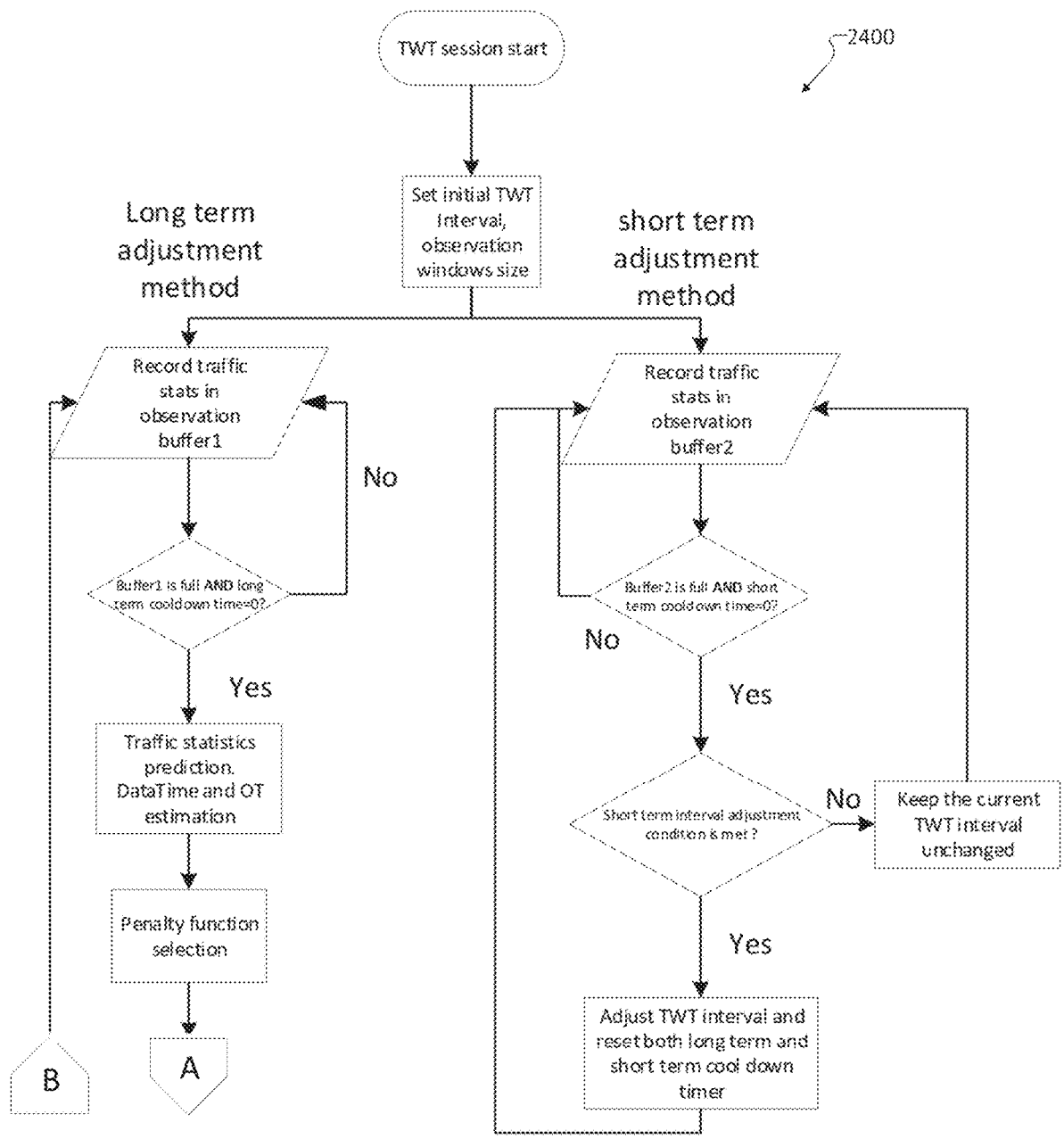
FIGS. 24A and 24B illustrate an example process that combines short term and long term TWT interval adjustment methods according to embodiments of the present disclosure.
Figure 24B:
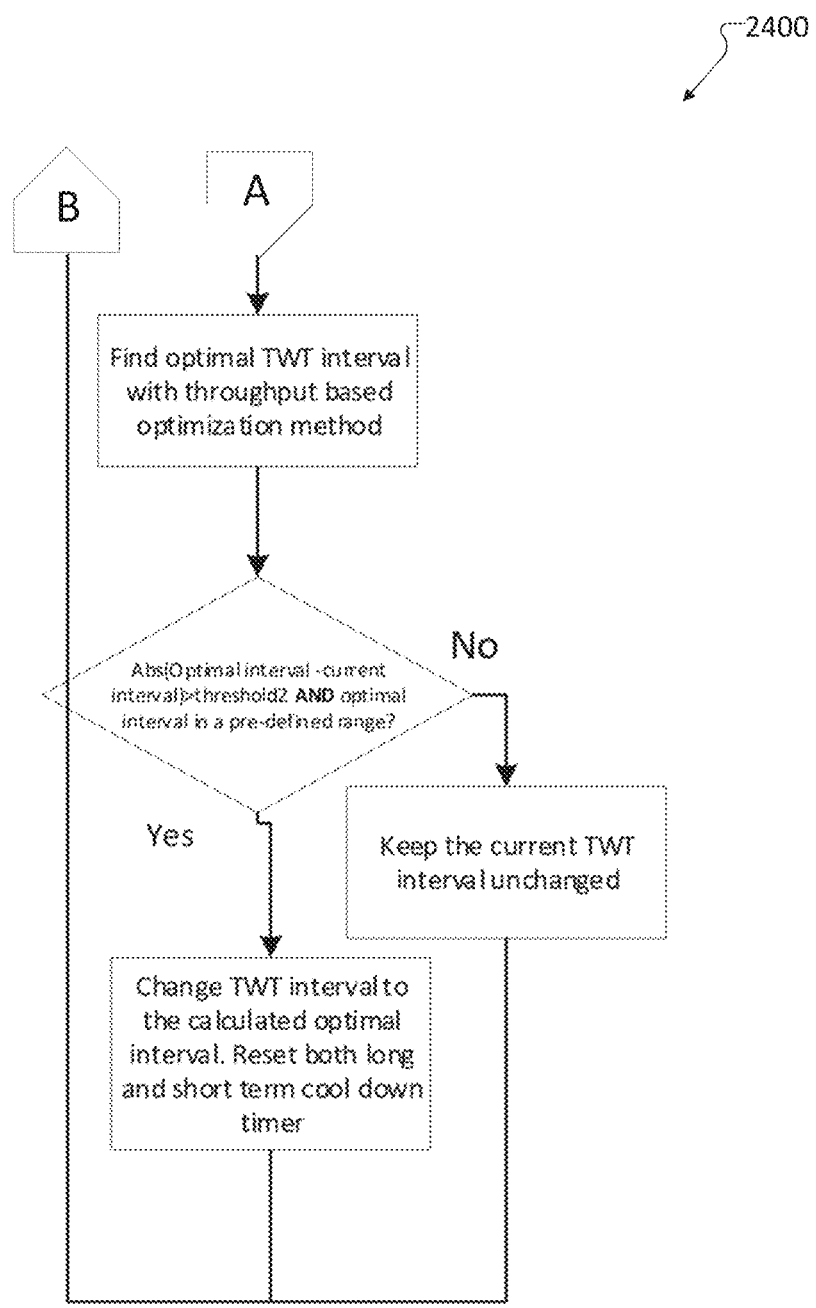

FIGS. 24A and 24B illustrate an example process 2400 that combines the short term and long term TWT interval adjustment methods such as described above.

Figure 25:
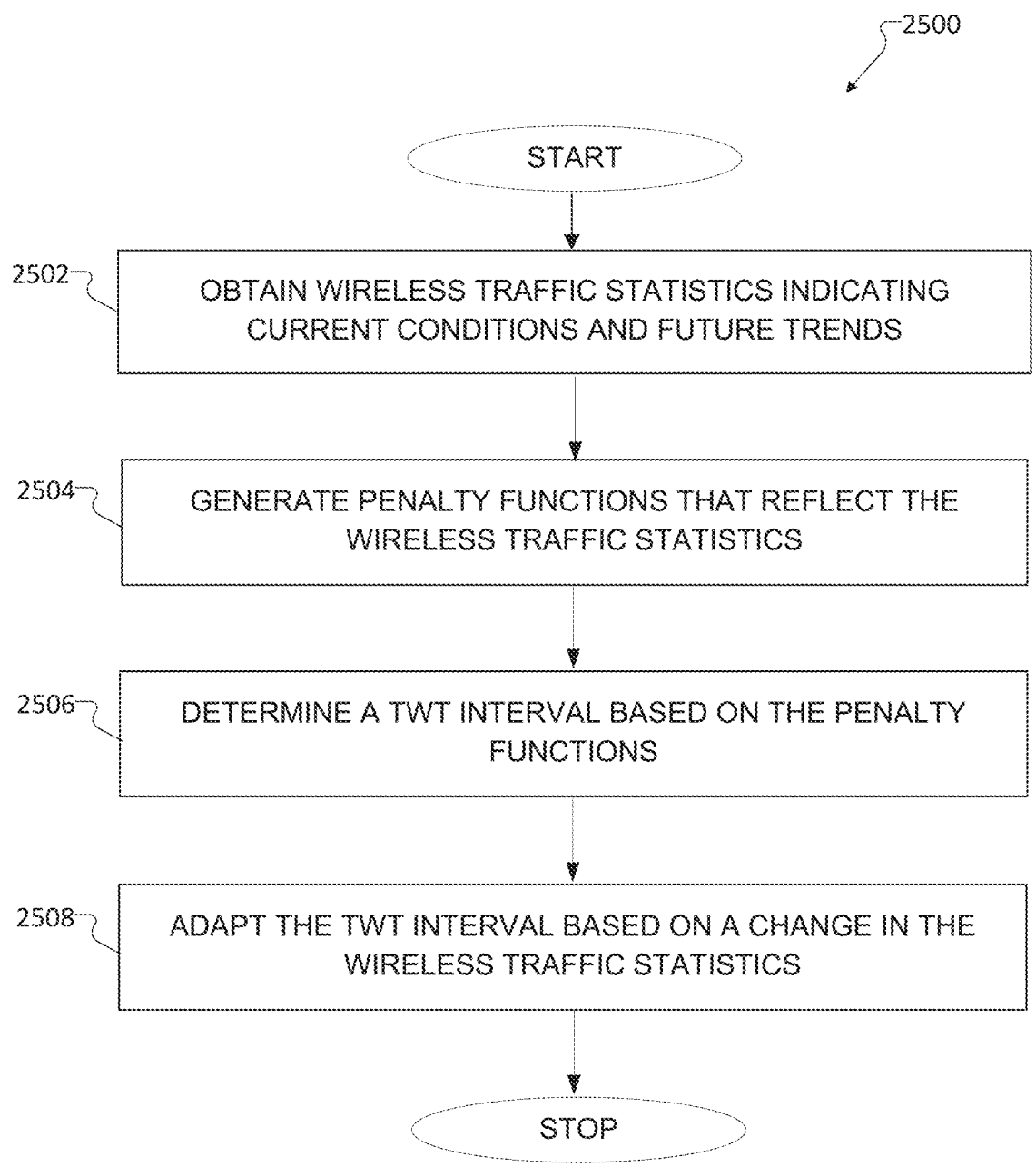
FIG. 25 illustrates a method for throughput-based optimization for TWT interval adjustment according to embodiments of the present disclosure.

FIG. 25 illustrates a method 2500 for throughput-based optimization for TWT interval adjustment according to embodiments of the present disclosure, as may be performed by a STA (e.g., one of the STAs 111-114 as illustrated in FIG. 1). In some embodiments, the STA can perform the method 2500 by implementing some or all of the process 900 of FIG. 9 and supporting details shown in FIGS. 10 through 24B. An embodiment of the method 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions.

As illustrated in FIG. 25, the method 2500 begins at step 2502. At step 2502, a STA obtains wireless traffic statistics indicating current conditions and future trends for at least one of throughput, latency, and device power consumption. This could include, for example, the STA 111 estimating current wireless traffic statistics and predicting future traffic statistics by applying a time series prediction model to observed traffic statistics of one or more observation windows.

At step 2504, the STA generates penalty functions that reflect the wireless traffic statistics. This could include, for example, the STA 111 generating one or more of the Type 1, Type 2, and Type 3 penalty functions shown in FIGS. 13 through 15.

At step 2506, the STA determines a TWT interval based on the penalty functions. This could include, for example, the STA 111 optimizing the objective function $f(I)$, which includes one or more of the Type 1, Type 2, and Type 3 penalty functions. In some embodiments, the objective function $f(I)$ can be expressed as in Equation (13).

At step 2508, the STA adapts the TWT interval based on a change in the wireless traffic statistics. This could include, for example, the STA 111 adapting the TWT interval using one of the short term TWT interval adjustment methods shown in FIGS. 22 and 23 and described above.

Although FIG. 25 illustrates one example of a method 2500 for throughput-based optimization for TWT interval adjustment, various changes may be made to FIG. 25. For example, while shown as a series of steps, various steps in FIG. 25 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
obtaining wireless traffic statistics indicating current conditions and predicted future trends for at least one of throughput, latency, and device power consumption;
generating penalty functions that reflect the wireless traffic statistics, each of the penalty functions comprising a first term associated with a TWT introduced latency and a second term associated with a wasted power ratio;
determining a target wakeup time (TWT) interval based on the penalty functions; and
adapting the TWT interval based on a change in the wireless traffic statistics.

2. The method of claim 1, wherein obtaining the wireless traffic statistics indicating the predicted future trends comprises:
predicting future traffic statistics by applying a time series prediction model to observed traffic statistics of one or more observation windows.

3. The method of claim 1, wherein the penalty functions comprise at least one of:
a first penalty function based on an anchor latency or an anchor wasted power ratio,
a second penalty function based on upper and lower bounds of the latency and the wasted power ratio, and
a third penalty function based on a best minimum latency and a best minimum wasted power ratio.

4. The method of claim 1, wherein determining the TWT interval based on the penalty functions comprises:
optimizing an objective function that includes the penalty functions, the objective function representing a trade-off between TWT introduced latency and TWT introduced power consumption.

5. The method of claim 1, wherein adapting the TWT interval comprises:
upon a determination that zero packets are transmitted or received during multiple observation windows, increasing the TWT interval; and
upon a determination that (i) duty cycles during the multiple observation windows are higher than a pre-defined duty cycle threshold and (ii) the TWT interval is larger than a pre-defined interval threshold, decreasing the TWT interval to a pre-defined interval value.

6. The method of claim 1, wherein the wireless traffic statistics correspond to a wireless device that is in a TWT early termination mode.

7. A device comprising:
a memory configured to store instructions; and
a processor operably connected to the memory, the processor configured when executing the instructions to:
obtain wireless traffic statistics indicating current conditions and predicted future trends for at least one of throughput, latency, and device power consumption;
generate penalty functions that reflect the wireless traffic statistics, each of the penalty functions comprising a first term associated with a TWT introduced latency and a second term associated with a wasted power ratio;
determine a target wakeup time (TWT) interval based on the penalty functions; and
adapt the TWT interval based on a change in the wireless traffic statistics.

8. The device of claim 7, wherein to obtain the wireless traffic statistics indicating the predicted future trends, the processor is configured to:
predict future traffic statistics by applying a time series prediction model to observed traffic statistics of one or more observation windows.

9. The device of claim 7, wherein the penalty functions comprise at least one of:
a first penalty function based on an anchor latency or an anchor wasted power ratio,
a second penalty function based on upper and lower bounds of the latency and the wasted power ratio, and
a third penalty function based on a best minimum latency and a best minimum wasted power ratio.

10. The device of claim 7, wherein to determine the TWT interval based on the penalty functions, the processor is configured to:
optimize an objective function that includes the penalty functions, the objective function representing a trade-off between TWT introduced latency and TWT introduced power consumption.

11. The device of claim 7, wherein to adapt the TWT interval, the processor is configured to:
upon a determination that zero packets are transmitted or received during multiple observation windows, increase the TWT interval; and
upon a determination that (i) duty cycles during the multiple observation windows are higher than a pre-defined duty cycle threshold and (ii) the TWT interval is larger than a pre-defined interval threshold, decrease the TWT interval to a pre-defined interval value.

12. The device of claim 7, wherein the wireless traffic statistics correspond to a wireless device that is in a TWT early termination mode.

13. A non-transitory computer readable medium comprising a plurality of instructions that, when executed by at least one processor, is configured to cause the at least one processor to:
obtain wireless traffic statistics indicating current conditions and predicted future trends for at least one of throughput, latency, and device power consumption;
generate penalty functions that reflect the wireless traffic statistics, each of the penalty functions comprising a first term associated with a TWT introduced latency and a second term associated with a wasted power ratio;
determine a target wakeup time (TWT) interval based on the penalty functions; and
adapt the TWT interval based on a change in the wireless traffic statistics.

14. The non-transitory computer readable medium of claim 13, wherein to obtain the wireless traffic statistics indicating the predicted future trends, the plurality of instructions is configured to cause the at least one processor to:
predict future traffic statistics by applying a time series prediction model to observed traffic statistics of one or more observation windows.

15. The non-transitory computer readable medium of claim 13, wherein the penalty functions comprise at least one of:
a first penalty function based on an anchor latency or an anchor wasted power ratio,
a second penalty function based on upper and lower bounds of the latency and the wasted power ratio, and
a third penalty function based on a best minimum latency and a best minimum wasted power ratio.

16. The non-transitory computer readable medium of claim 13, wherein to determine the TWT interval based on the penalty functions, the plurality of instructions is configured to cause the at least one processor to:
optimize an objective function that includes the penalty functions, the objective function representing a trade-off between TWT introduced latency and TWT introduced power consumption.

17. The non-transitory computer readable medium of claim 13, wherein to adapt the TWT interval, the plurality of instructions is configured to cause the at least one processor to:
upon a determination that zero packets are transmitted or received during multiple observation windows, increase the TWT interval; and
upon a determination that (i) duty cycles during the multiple observation windows are higher than a pre-defined duty cycle threshold and (ii) the TWT interval is larger than a pre-defined interval threshold, decrease the TWT interval to a pre-defined interval value.

18. The method of claim 1, wherein the wireless traffic statistics comprise at least one of a total packet size and a data rate.

19. The device of claim 7, wherein the wireless traffic statistics comprise at least one of a total packet size and a data rate.

20. The non-transitory computer readable medium of claim 13, wherein the wireless traffic statistics comprise at least one of a total packet size and a data rate.

* * * * *